United States Patent
Sato et al.

[19]

[11] Patent Number: 5,963,379

[45] Date of Patent: Oct. 5, 1999

[54] COMPACT ZOOM LENS

[75] Inventors: Susumo Sato, Tokyo; Naoko Kodama, Kawasaki, both of Japan

[73] Assignee: Nikon Corporation, Tokyo, Japan

[21] Appl. No.: 08/991,790

[22] Filed: Dec. 12, 1997

[30] Foreign Application Priority Data

Dec. 12, 1996 [JP] Japan .................................. 8-352720

[51] Int. Cl.$^6$ .................................................. G02B 15/14
[52] U.S. Cl. .......................................... 359/691; 359/683
[58] Field of Search .................................. 359/691, 687, 359/688

[56] References Cited

U.S. PATENT DOCUMENTS

| | | | |
|---|---|---|---|
| 5,663,836 | 9/1997 | Ogata | 359/691 |
| 5,737,129 | 4/1998 | Ohtake | 359/691 |
| 5,805,349 | 9/1998 | Sato | 359/682 |
| 5,808,811 | 9/1998 | Iyama | 359/692 |

*Primary Examiner*—Georgia Epps
*Assistant Examiner*—Michael A Lucas

*Attorney, Agent, or Firm*—Chapman and Cutler

[57] ABSTRACT

A compact and inexpensive zoom lens having a variable power ratio of two or greater and reduced total length of the lens system. The compact zoom lens comprises a first lens group having a negative refractive power and a second lens group having a positive refractive power in this order from the object side. The first lens group includes a negative lens component $L_1$ and a positive lens $L_2$ in this order from the object side. The second lens group includes a positive lens component $L_3$, a negative lens $L_4$ and a positive lens $L_5$ positioned in this order from the object side with an air gap between them. When the focal legth of the whole lens system is varied from its wide-angle end to the telephoto end, the second lens group is being moved toward the object side from the image side. This zoom lens satisfies the conditions $0.7 < f_2/F_W < 1.4$ $-1.7 < f_1/F_W < -1.0$ where $f_1$ is the focal length of the first lens group, $f_2$ is the focal length of the second lens group, and $F_W$ is the focal length of the whole lens system at the wide-angle end.

14 Claims, 21 Drawing Sheets

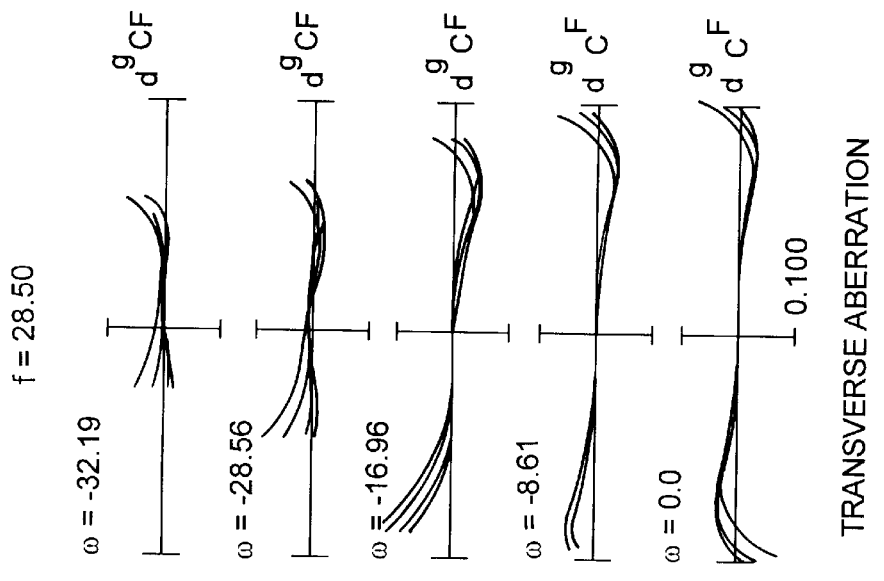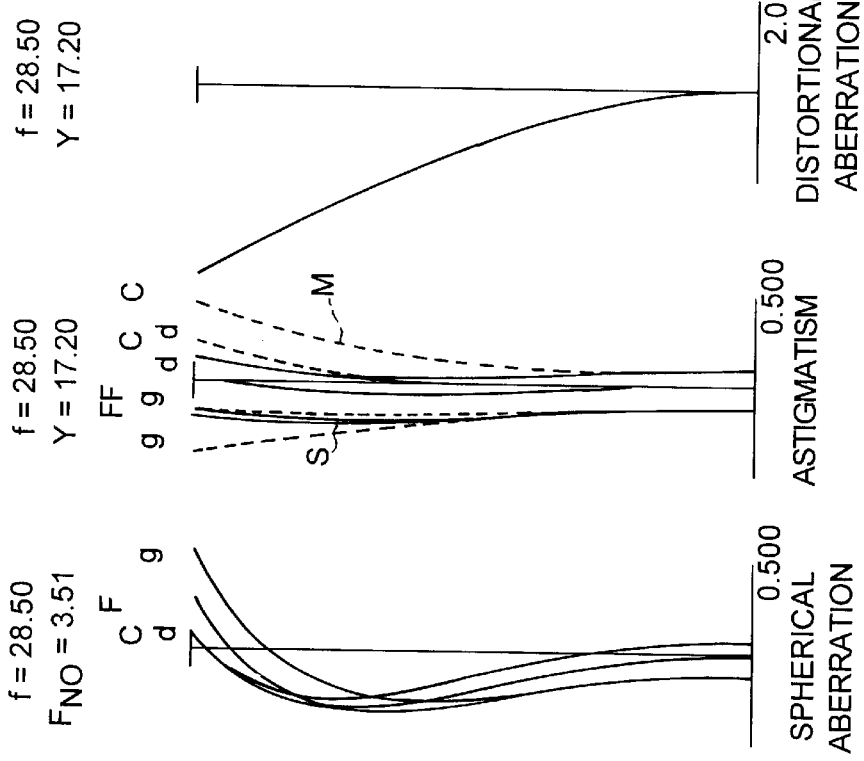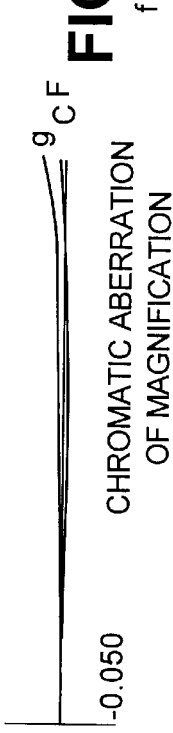

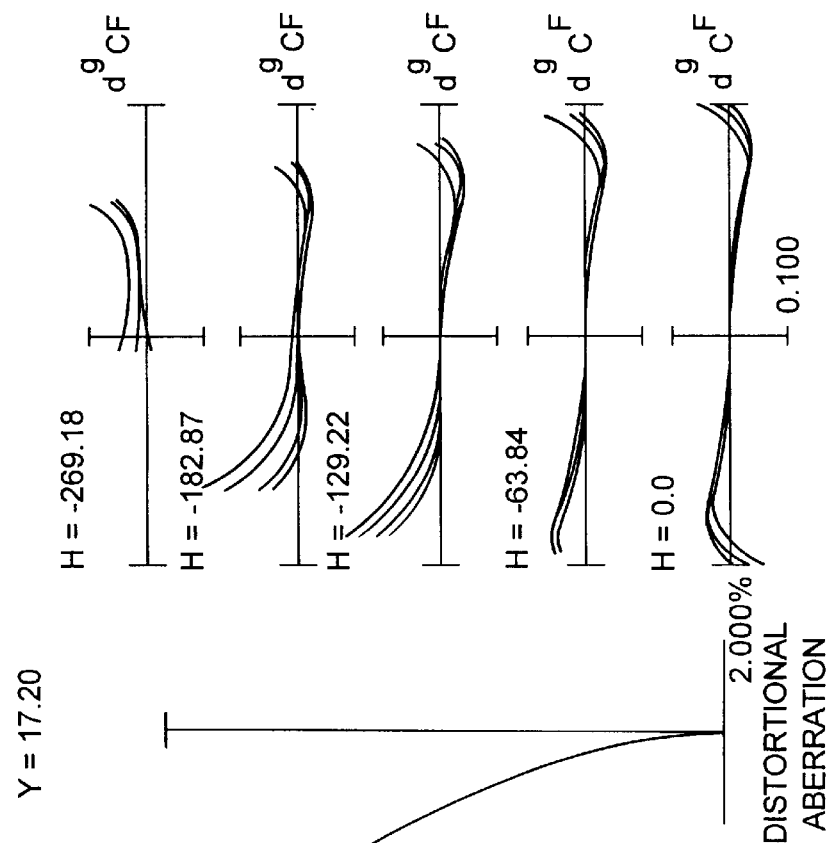

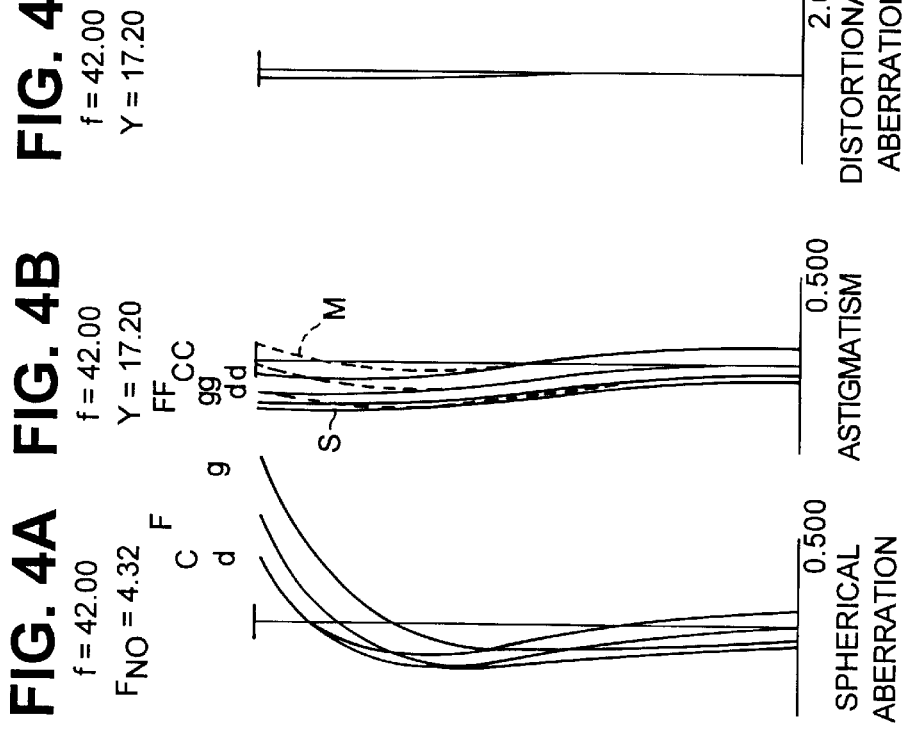
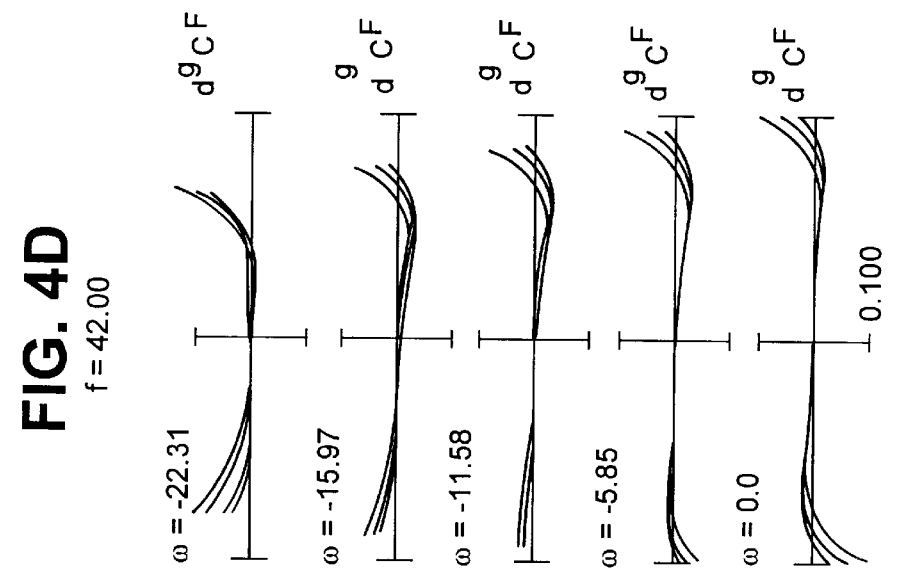
FIG. 4A  FIG. 4B  FIG. 4C  FIG. 4D  FIG. 4E

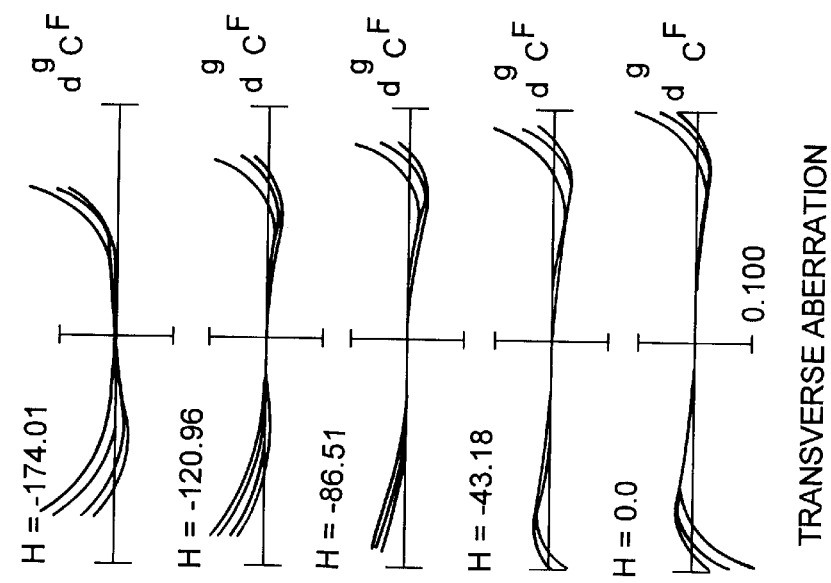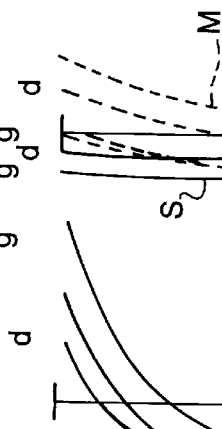

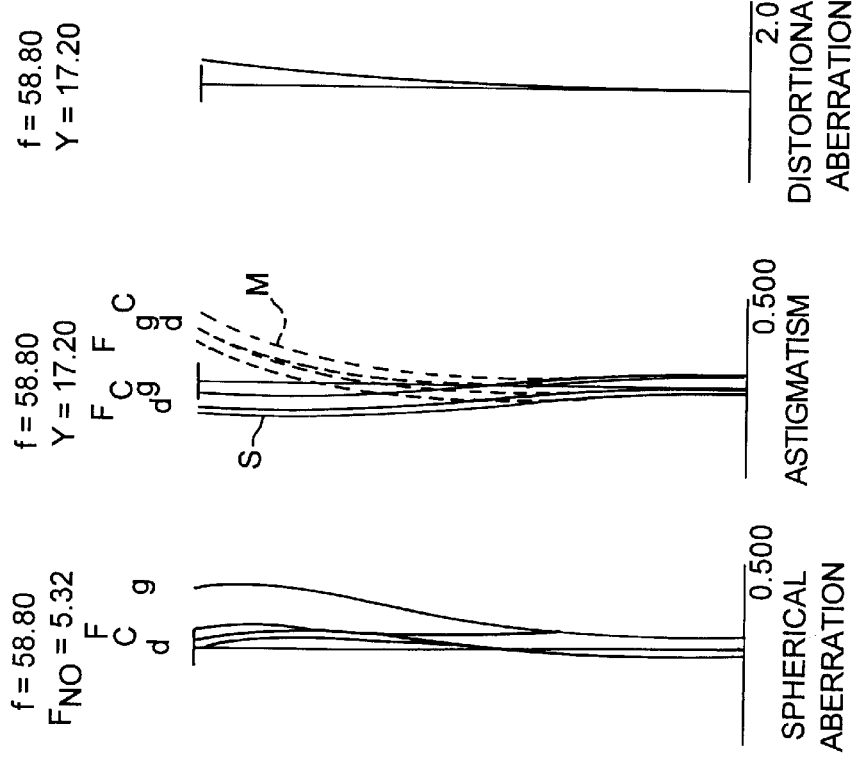

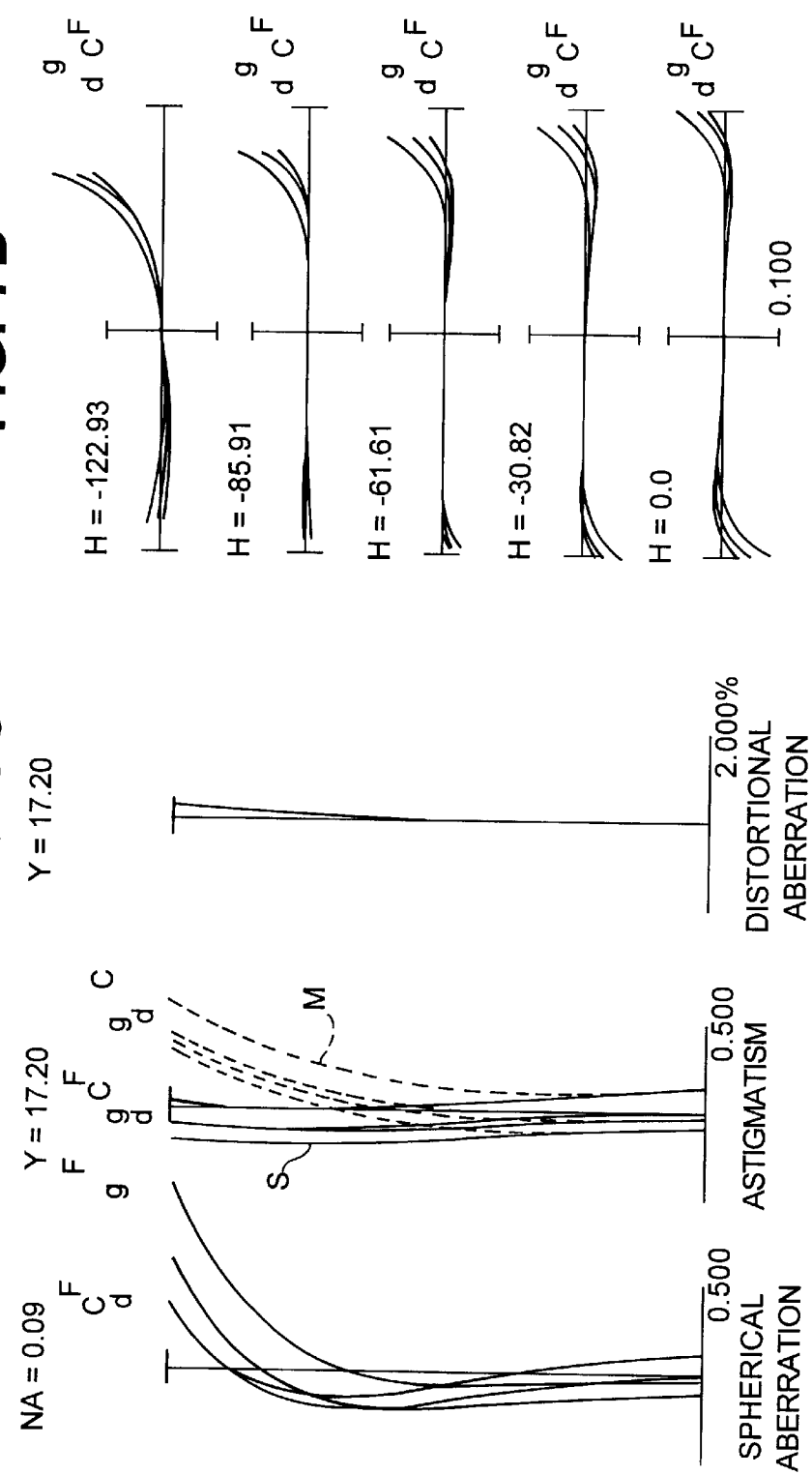

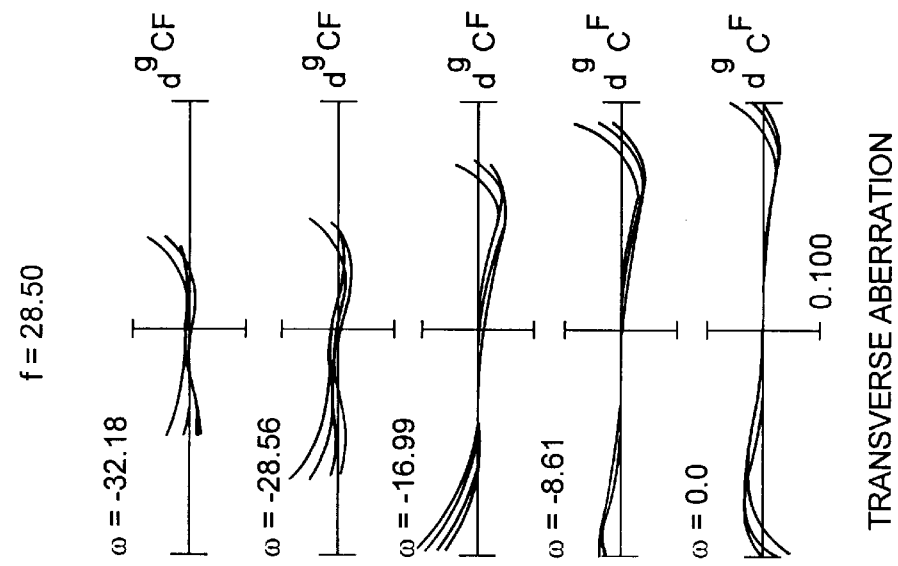
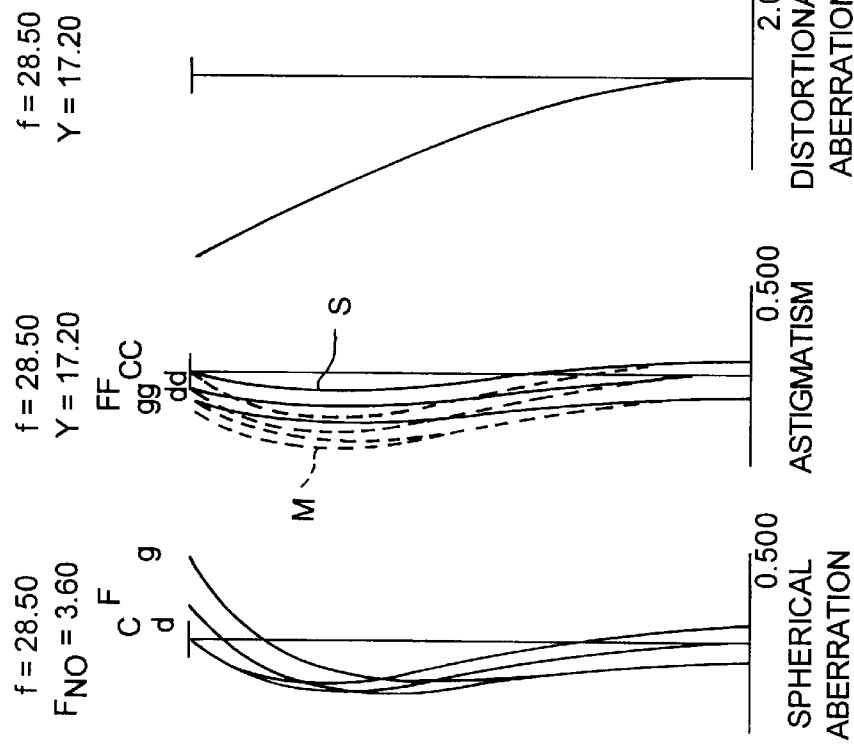
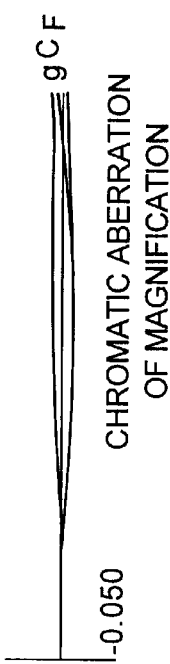

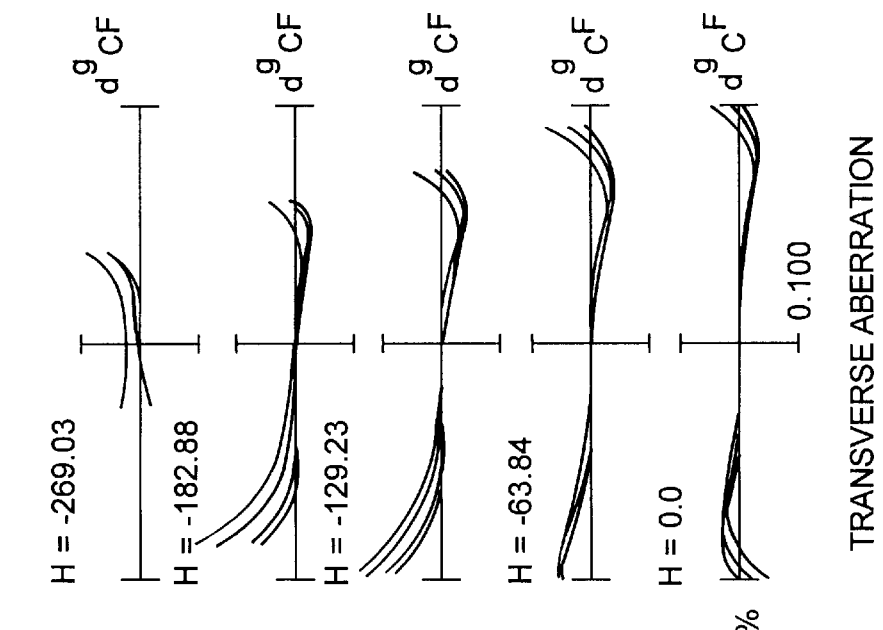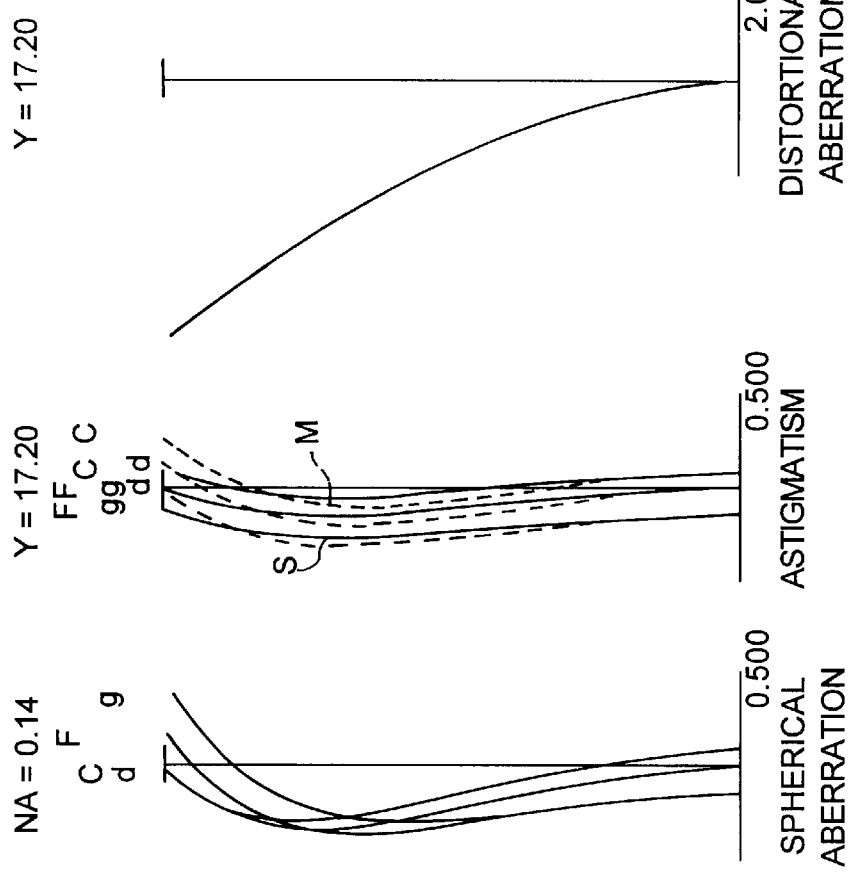

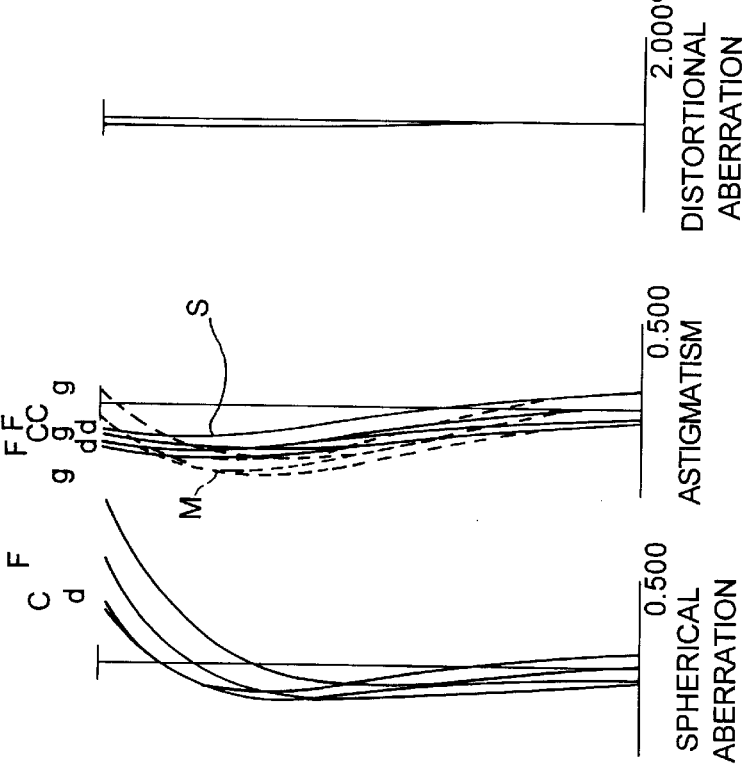

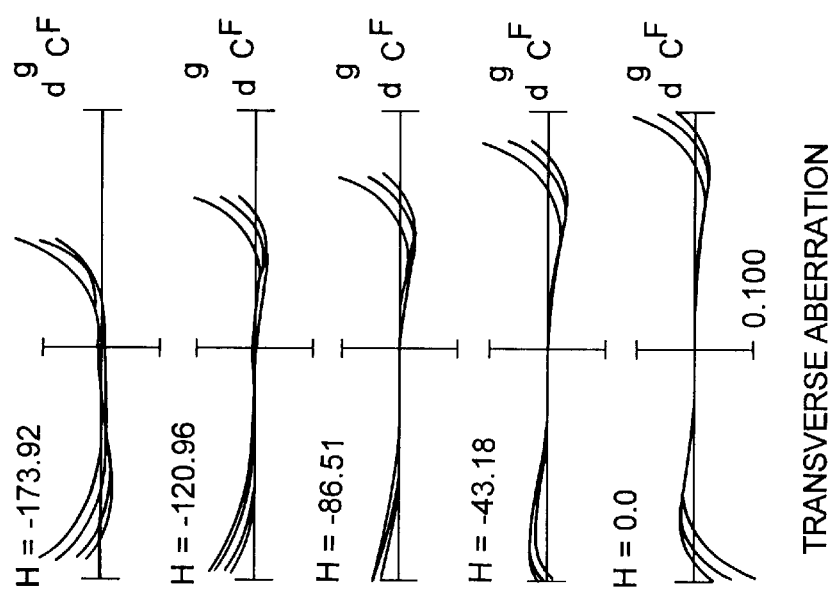
FIG. 12A  FIG. 12B  FIG. 12C
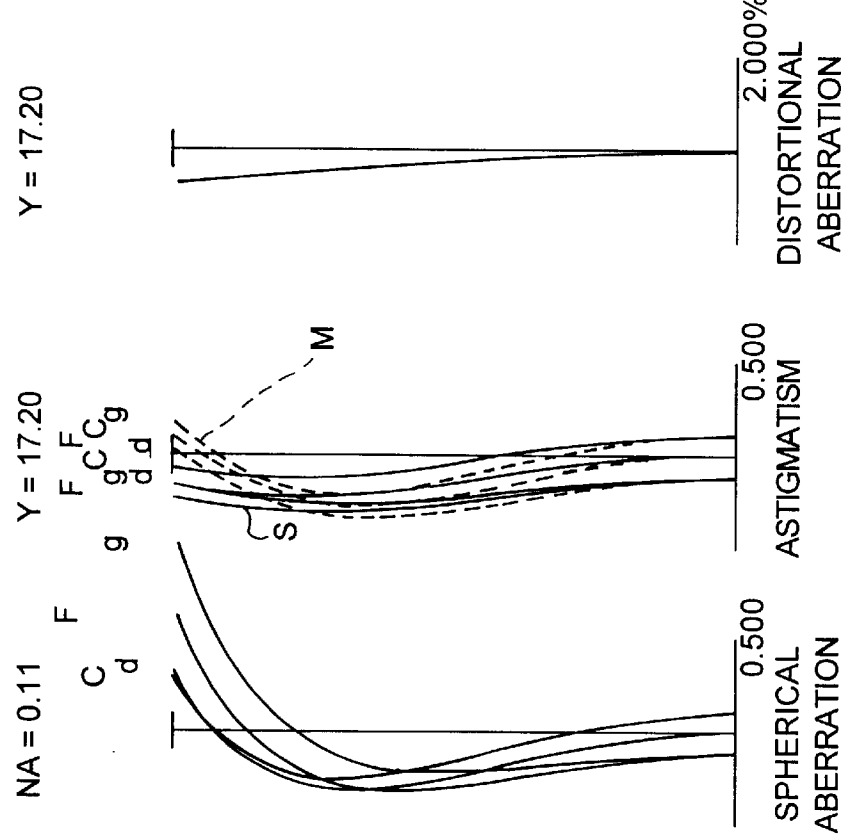
FIG. 12D
FIG. 12E

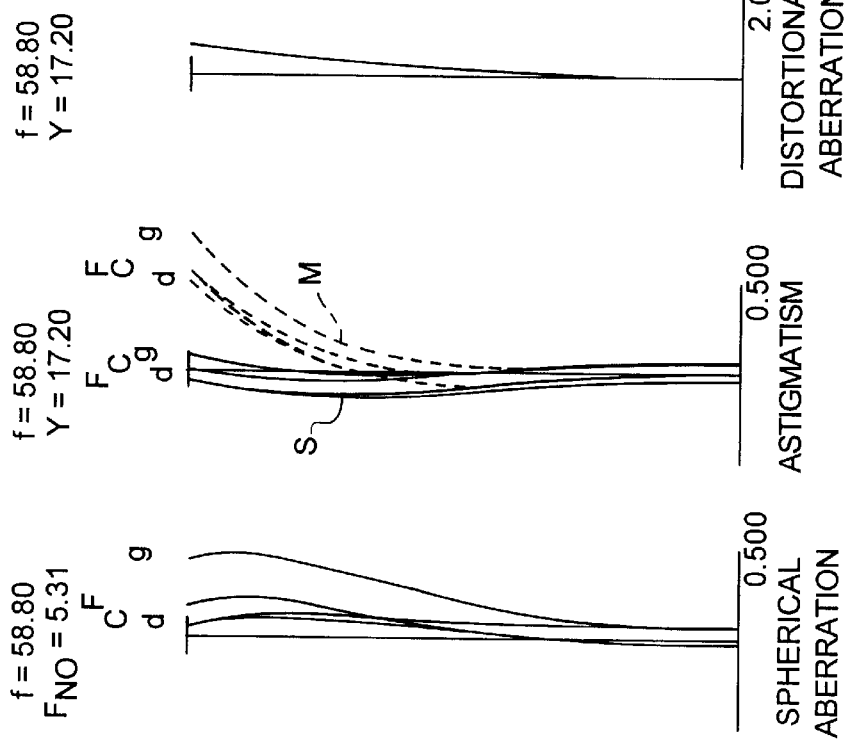

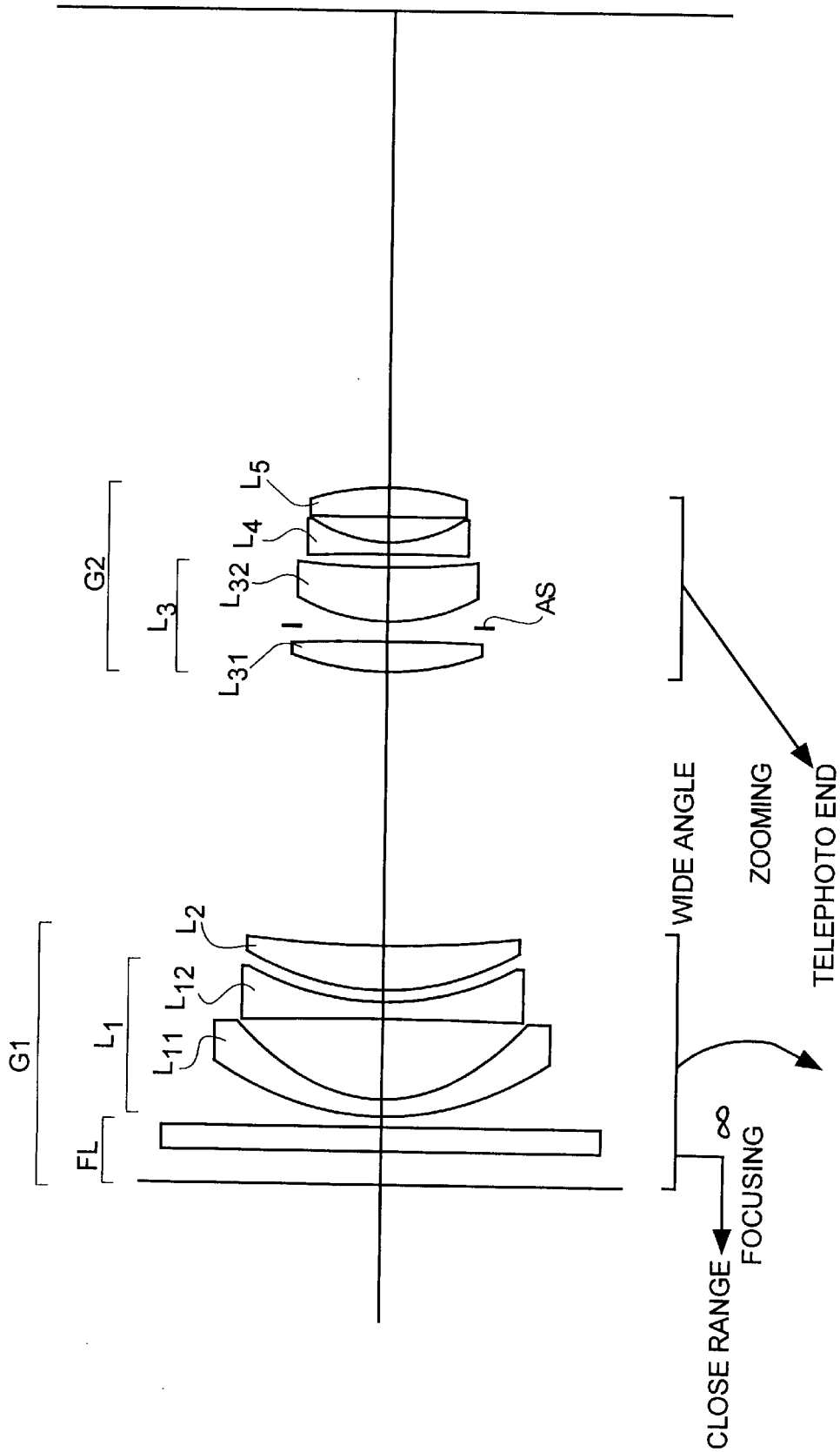

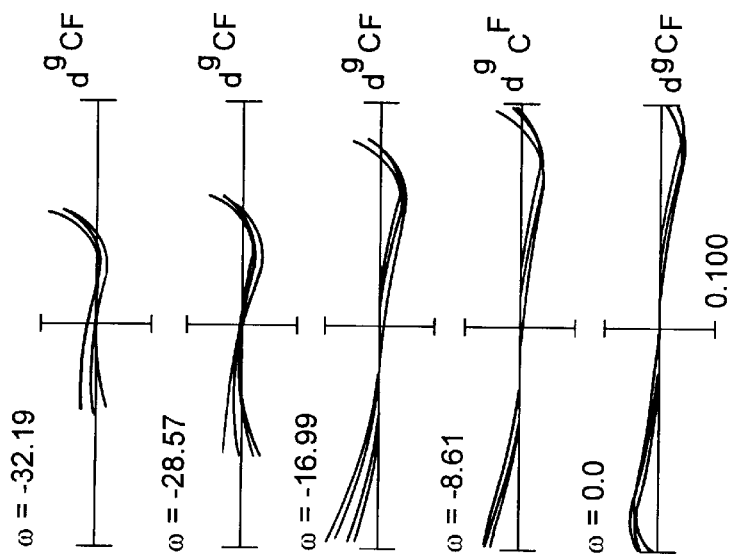
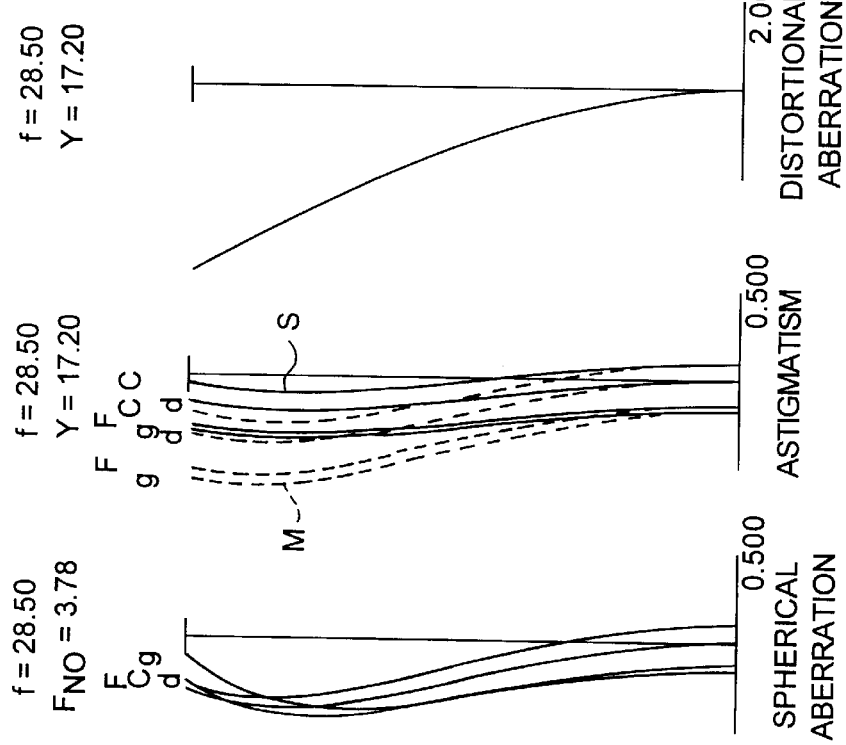

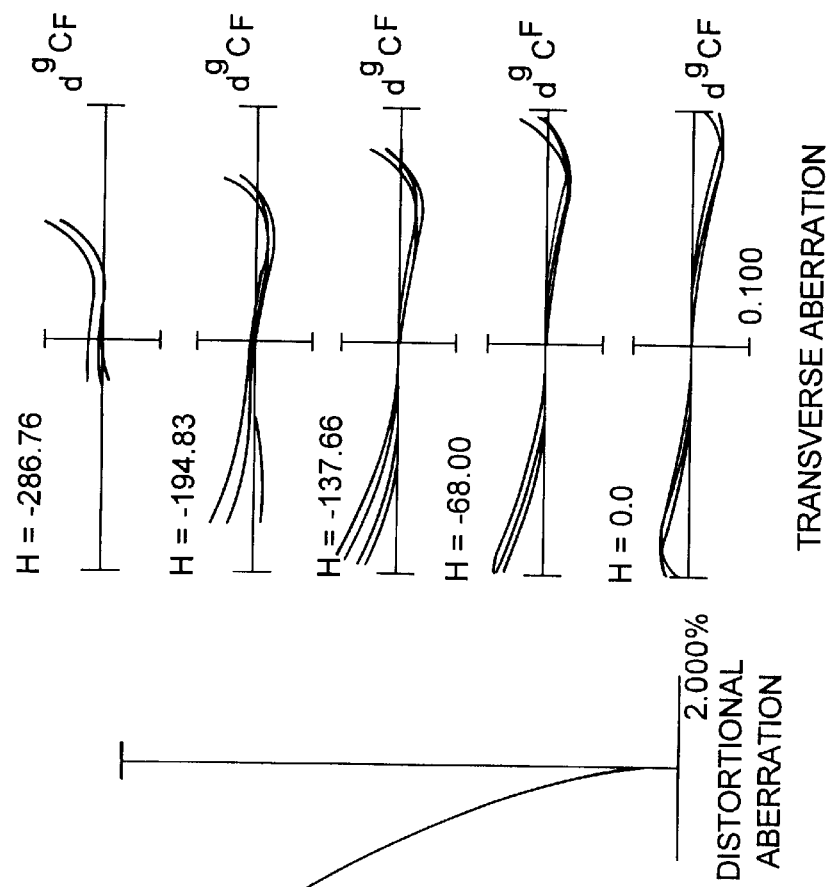
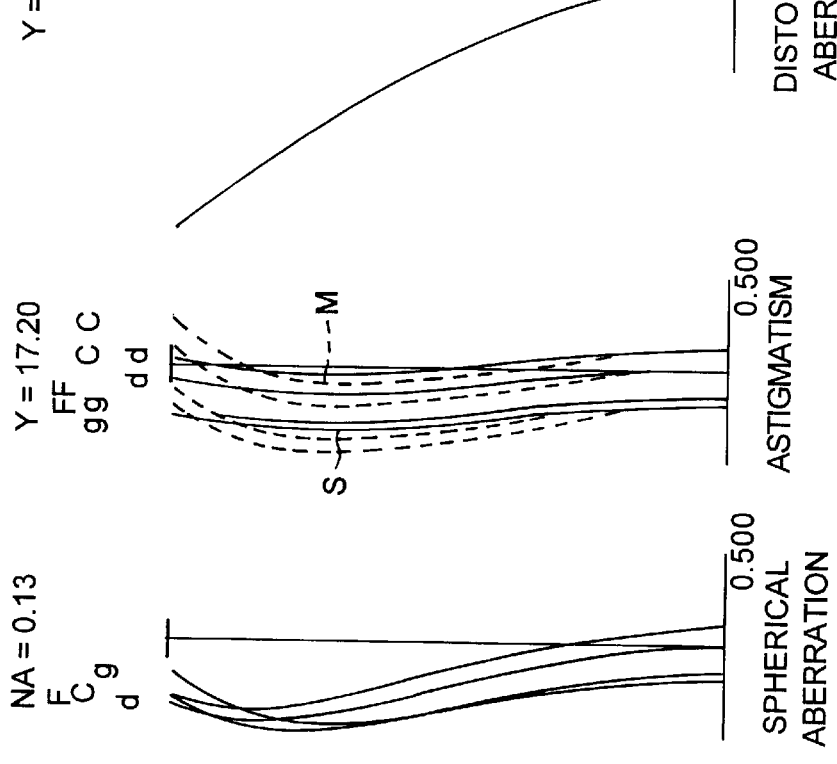

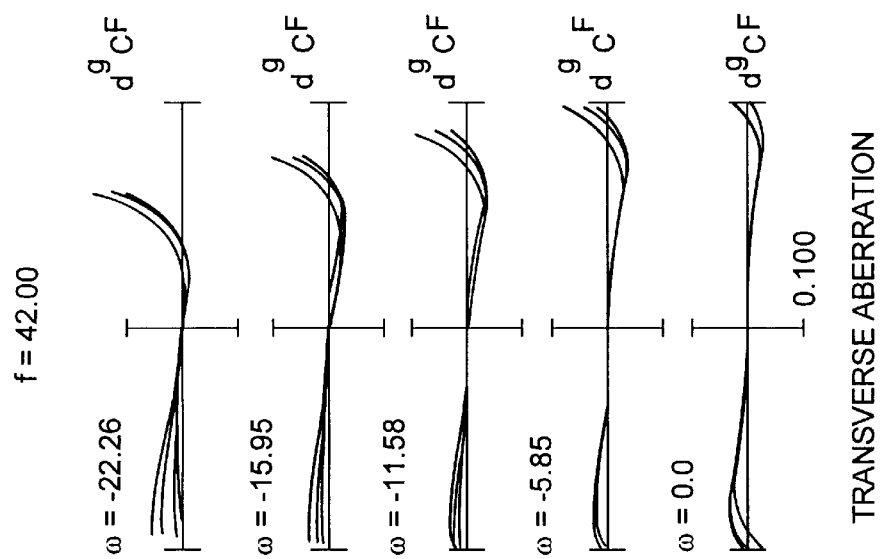
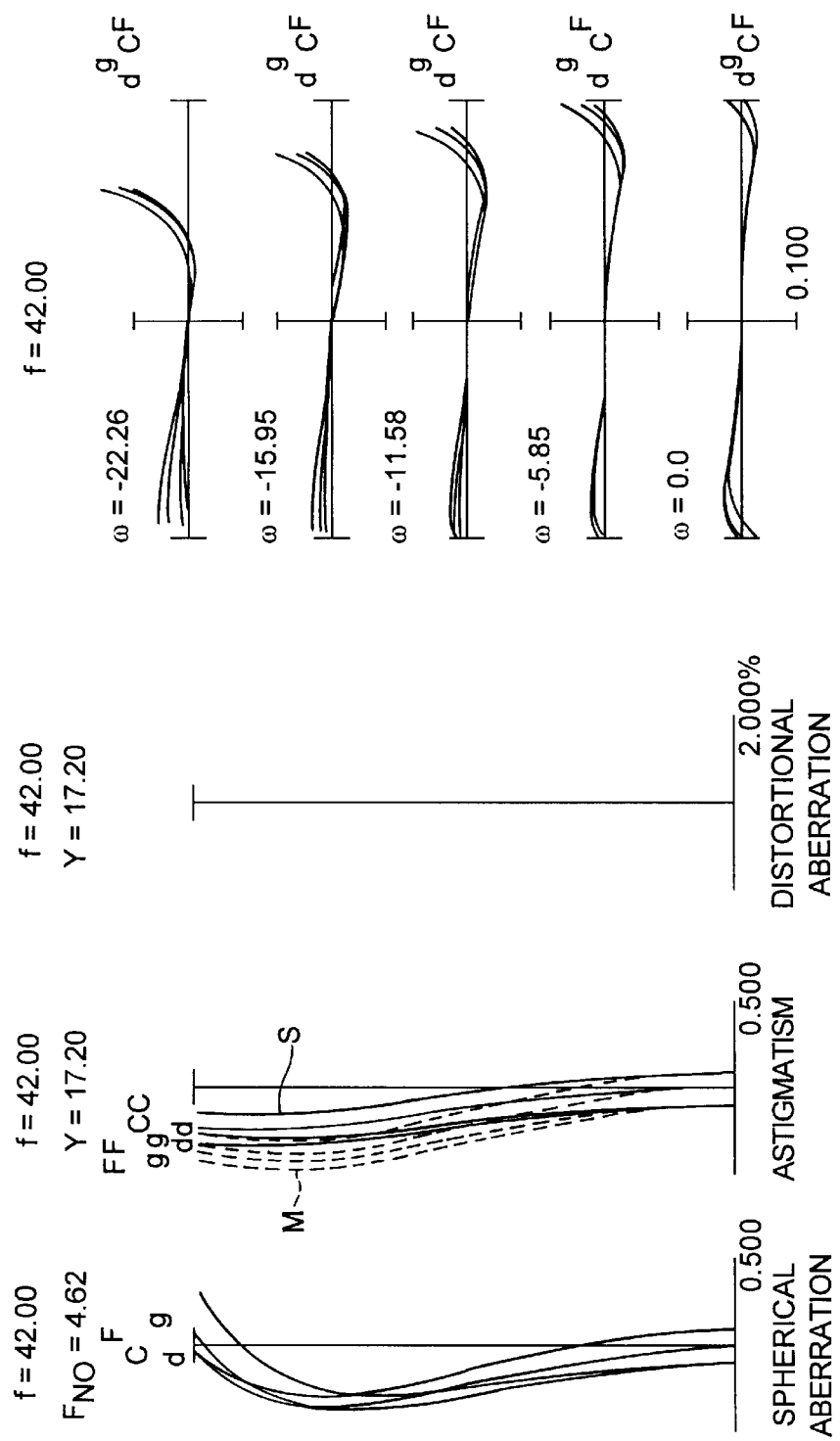

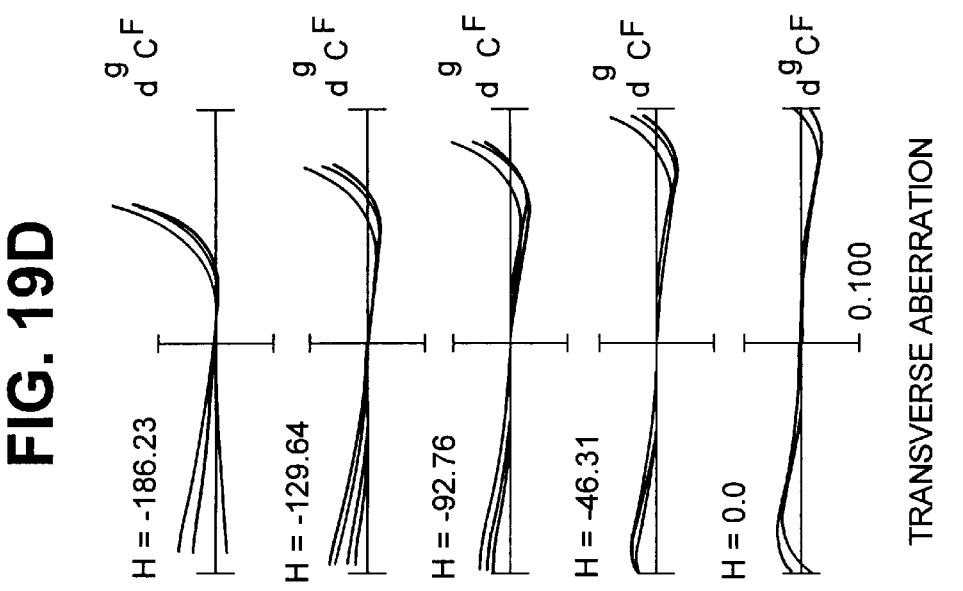
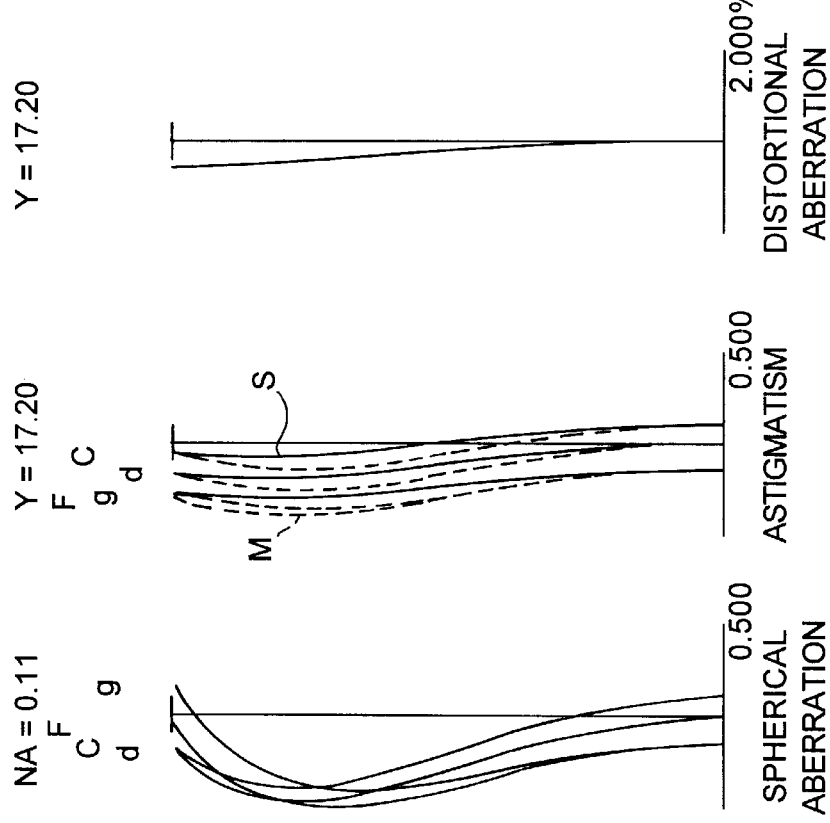

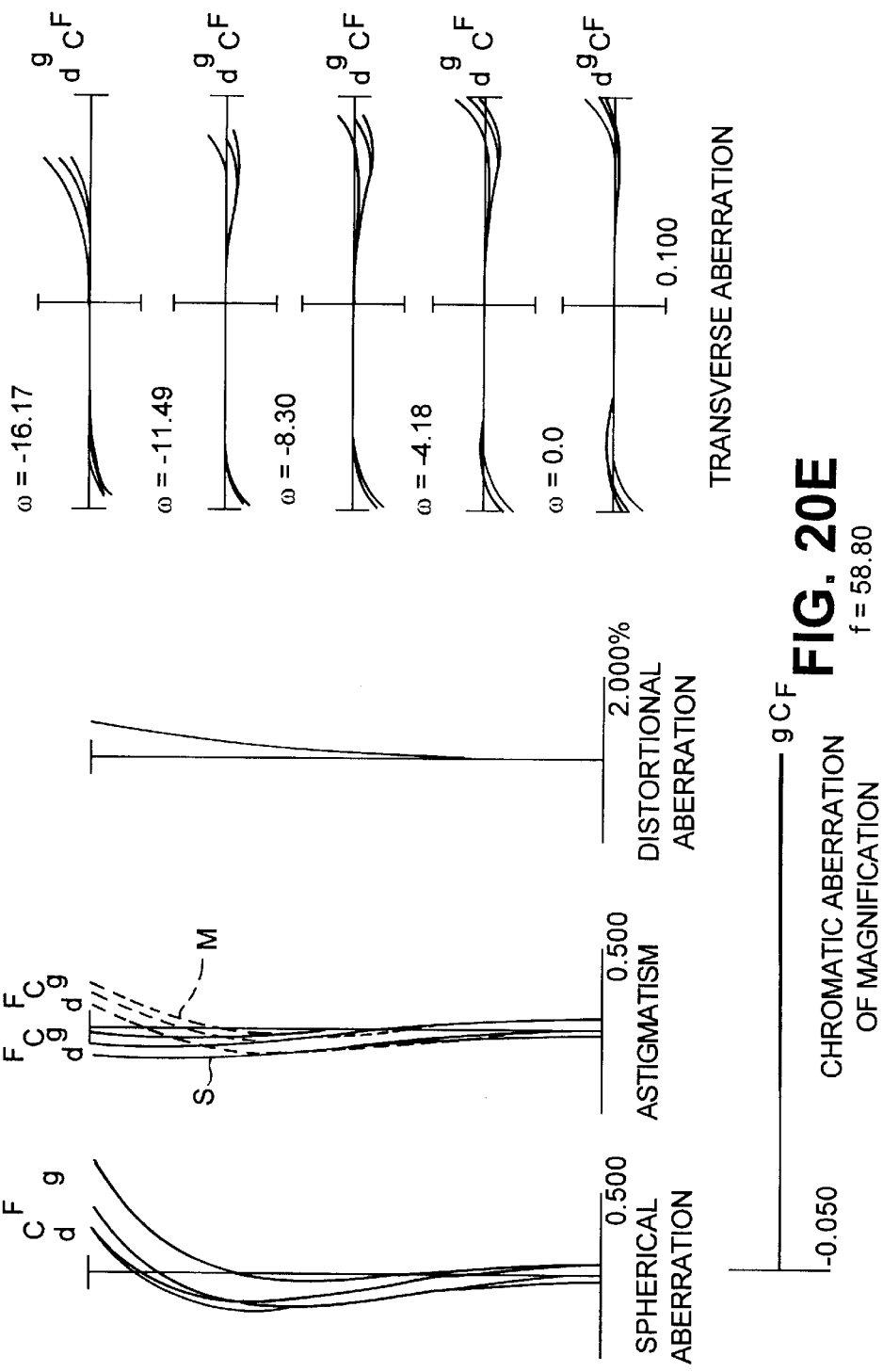

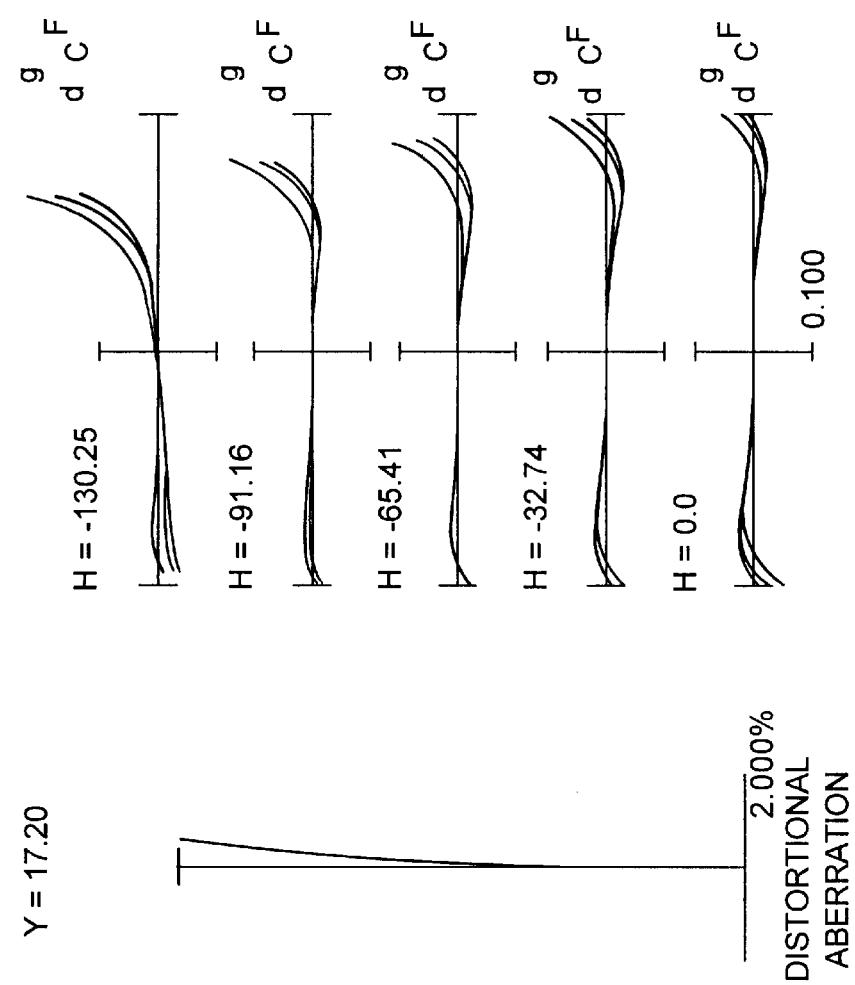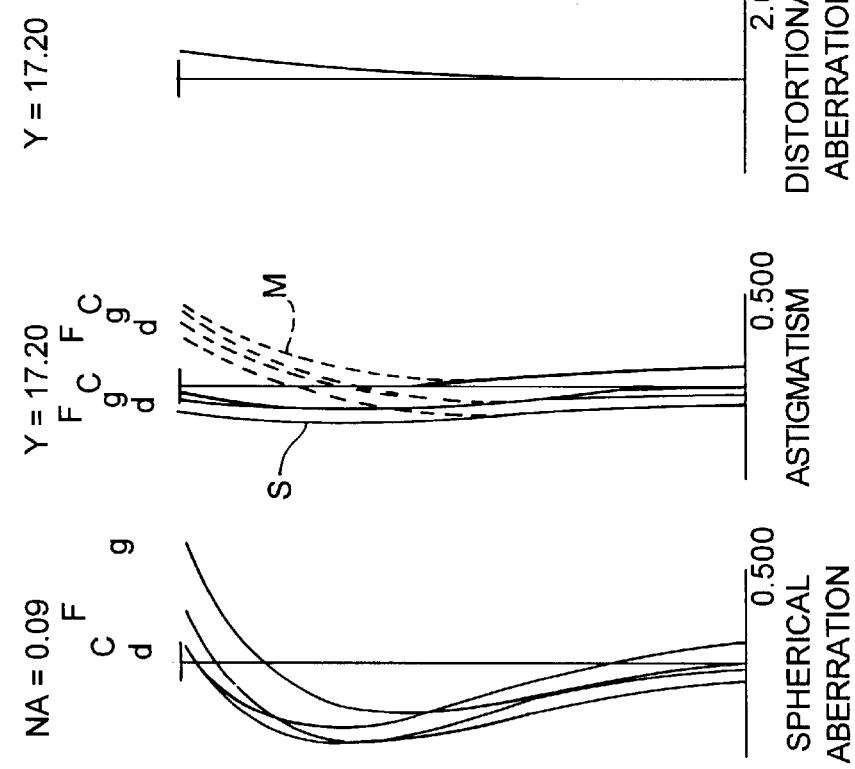

COMPACT ZOOM LENS

BACKGROUND OF THE INVENTION

1. Field of Invention

This invention generally relates to zoom lenses, and more particularly to compact and portable zoom lenses used in compact cameras.

2. Description of the Related Art

In general, if conventional zoom lenses are designed so as to have a power ratio of two or greater, the total lengths of their lens systems become relatively long, which prevents these zoom lenses from being adequately used in compact cameras. On the other hand, if a conventional zoom lens is designed so as to reduce its focal lengths at wide-angle end to about 28 mm, the structure of the lens system becomes too complicated, resulting in a high manufacturing cost.

SUMMARY OF THE INVENTION

Accordingly, it is an object of the present invention to provide an inexpensive compact zoom lens which has a power ratio of two or greater, while it can be easily carried and adequately used in compact cameras. It is another object of the invention to provide a compact zoom lens which has a wide angle of view and reduced total length of its lens system.

In order to achieve these objects, the compact zoom lens according to the present invention comprises a first lens group $G_1$ having a negative refractive power, and a second lens group $G_2$ having a positive refractive power in this order from the object side of the zoom lens. The first lens group $G_1$ includes a negative lens component $L_1$ and a positive lens $L_2$ in this order from the object side. The second lens group $G_2$ includes a positive lens component $L_3$, a negative lens $L_4$, and a positive lens $L_5$ in this order from the object side positioned with an air gap between them. The focal length of the whole lens system can be varied from its wide-angle end to telephoto end by advancing the second lens group from the image side of the zoom lens toward the object side.

In the present invention, it is preferable for the zoom lens to satisfy the following conditions:

$$0.7 < f_2/F_W < 1.4 \quad (1)$$

$$-1.7 < f_1/F_W < -1.0 \quad (2)$$

where $f_1$ is the focal length of the first lens group $G_1$, $f_2$ is the focal length of the second lens group $G_2$, and $F_W$ is the focal length of the whole lens system at the wide-angle end.

Since one of the objects of the present invention is to make the zoom lens as compact as possible, while achieving variable power ratio of two or greater, the proposed zoom lens employs a two-lens-group structure as a variable-power photographic lens system. There are two categories of the two-lens-group type lens systems, namely, a telephoto type in which a positive lens group is positioned on the object side of a negative lens group, and a retrofocus type in which a negative lens group is positioned on the object side of a positive lens group.

The telephoto type lens system has an advantage that the total length of the lens system can be reduced; however, its back focus is likely to shorten, which is not suitable for a wide angle of view.

The retrofocus type lens system may have a long back focus and thus can be suitable to a wide angle of view; however, the total length of the lens system is apt to increase. As the total length increases, the effective diameter of the first lens group must be increased in order to correctly guide the incident rays which strike the first lens group at a wide angle view to the second lens group.

Since the objective of the present invention is to provide a variable-power photographic lens system with a wide angle of view, the proposed zoom lens system uses a retrofocus type two-lens-group lens system. Such a retrofocus type two-lens-group lens system is further improved in this invention so as to reduce the total length of the lens system. The zoom lens according to the invention comprises a first lens group $G_1$ having a negative refractive power and a second lens group $G_2$ having a positive refractive power.

When the focal length of the whole lens system is varied from its wide-angle end to the telephoto end, the second lens group $G_2$ is moved toward the object side of the zoom lens from the image side upon zooming.

The basic function of the second lens group $G_2$ having a positive refractive power serves as a master lens group and to control the magnification of the entire lens system, while the first lens group $G_1$ having a positive refractive power serves as a compensating lens group.

The total length of the lens system can be shortened by reducing the focal length of the second lens group $G_2$, which has a positive refractive power. This means that the back focus of the master lens group $G_2$ is also reduced. In order to compensate the shortened back focus of the master lens group $G_2$ and to widen the angle of view the negative refractive power of the first lens group $G_1$ is increased by reducing its focal length. When the refractive power of the first lens group $G_1$ is enhanced, the driving amount of the second lens group $G_2$ required to change the power can be reduced. Thus, the working distance required to achieve the variable power ratio of two or greater can be secured within a relatively short range.

Concerning correction for the aberrations, since the first lens group $G_1$ must have a simple lens structure (for example, concave-convex bistructure) and, at the same time, a strong refractive power, the first lens group $G_1$ mainly reduces fluctuations in the aberrations which arise during the zooming, while the Seidel's five aberrations remain to a certain extent. However, the second lens group $G_2$, as the master lens group, has a convex-concave-convex triplet structure which allows to correct the remaining Seidel's five aberrations. Accordingly, in the present invention the first lens group $G_1$ comprises a negative lens component $L_1$ and a positive lens $L_2$ in this order from the object side, and the second lens group G2 comprises a positive lens component $L_3$, a negative lens $L_4$, and a positive lens $L_5$ in this order from the object side. The positive lens component $L_3$, the negative lens $L_4$ and the positive lens $L_5$ in the second lens group $G_2$ are separated by air gaps between any of them.

The expression or inequality defined by the condition (1) above defines the preferable range of the ratio between the focal length of the second lens group $G_2$ and the focal length of the whole lens system in order to efficiently reduce the total length of the photographic lens system. When the value of $f_2/F_W$ falls below the lower limit of the expression (1), the air gap between the first lens group $G_1$ and the second lens group $G_2$ becomes smaller. This generates a possibility that a working distance required to achieve the variable-power ration of two or greater cannot be achieved. On the other hand, when the value of $f_2/F_W$ exceeds above the upper limit of the expression (1), the total length of the photographic lens system becomes too long, which is not preferable. It is more preferable for the value of $f_2/F_W$ to range from 0.85 to 1.25.

The expression or inequality defined by condition (2) above defines the preferable range of the ratio between the focal length of the first lens group $G_1$ and the focal length of the entire lens system in order to compensate for the reduced back focus of the second lens group $G_2$ and widen the angle of view. When the value of $f_1/F_W$ falls below the lower limit of the expression (2), the negative refractive power of the first lens group $G_1$ becomes too strong, thereby making it difficult to reduce the aberration fluctuation which occurs during the zooming. When the value of $f_2/F_W$ exceeds above the upper limit of the expression (2), the angle of view cannot be sufficiently widened. It is preferable for the expression (2) to range from −1.25 to −0.5.

In addition, in order to satisfactorily correct the coma, it is preferable for the zoom lens of the present invention to satisfy the following condition or expression:

$$-0.018 < 1/(N_d f_1) < -0.011 \tag{3}$$

where $N_d$ is an average refractive index of all the lenses included in the first lens group with respect to d-line.

Expression (3) defines the relation between the average refractive index $N_d$ of the first lens group $G_1$ and the focal length $f_1$ of the first lens group $G_1$. When the ratio falls below the lower limit of the expression (3), the coma increases at the wide-angle end. When the ration exceeds above the upper limit of the expression (3), expensive glass must be used for the lenses in the first lens group $G_1$. Thus, this is not preferable and contrary to the purpose of the present invention. It is preferable for expression (3) to range from −0.016 to −0.012.

Furthermore, in order to reduce the fluctuation of the image plane (i.e., focusing plane), the negative lens component $L_1$ of the first lens group $G_1$ may be composed of a negative meniscus lens $L_{11}$ and a negative lens $L_{12}$ in this order from the object side. As has been mentioned above, the first lens group $G_1$ has a very strong negative refractive power for this type of photographic lens. Accordingly, if the first lens group $G_1$ is composed of a single concave lens, which has a strong refractive power, and a single convex lens, it is difficult for the convex (positive) lens to compensate the high-degree aberrations arising from the concave (negative) lens. Therefore, in order to reduce the high-degree aberrations in advance without using an expensive aspheric lens, the negative lens component $L_1$ may be composed of two concave lenses. Of course, an aspherical lens surface may be applied to the negative lens component $L_1$ without regard to cost. In this case, the angle of view can be further widened at the wide-angle end, and the negative lens component $L_1$ can comprise a single concave lens.

The convex surface of the negative meniscus lens $L_{11}$ of the negative lens component $L_1$ faces the object side in order to reduce the fluctuation of the image plane. It is preferable for the negative meniscus lens $L_{11}$ to satisfy the condition or expression:

$$0.07 < |\phi_1/R_1 - \phi_2/R_2| < 0.9 \tag{4}$$

where $\phi_1$ is an effective radius of the object-side lens surface of the negative meniscus lens $L_{11}$, $\phi_2$ is the effective radius of the image-side lens surface of the negative meniscus lens $L_{11}$, $R_1$ is the radius of curvature of the object-side lens surface of the negative meniscus lens $L_{11}$, and $R_2$ is the radius of curvature of the image-side lens surface of the negative meniscus lens $L_{11}$. Thus, only when the expression (4) is satisfied, the negative meniscus lens $L_{11}$ can be manufactured with a high degree of precision at less expense.

When the value of the expression (4) falls below the lower limit, the optically coaxial line, which extends between the center of the first lens surface (i.e., the object-side surface) and the center of the second lens surface (i.e., the image-side surface) of the negative meniscus lens $L_{11}$, does not align with the mechanical axis which is the central axis of the outer diameter of the this meniscus lens. Accordingly, it becomes difficult to reduce the transmissive decentration of the negative meniscus lens $L_{11}$. It is not preferable. On the other hand, when it exceeds above the upper limit, the radius of curvature of the second lens surface of the negative meniscus lens $L_{11}$ becomes too small, which makes it difficult to apply an antireflection coating to the lens in the mass-production line. It is preferable for $R_1$ and $R_2$ of the negative meniscus lens $L_{11}$ to vary so that the value of the expression (4) ranges from 0.2 to 0.4.

In order to correct the bend of spherical aberration, the lens component $L_3$ of the second lens group $G_2$ may be composed of two positive lenses $L_{31}$ and $L_{32}$. Since the second lens group $G_2$ has a very strong positive refractive power for this type of photographic lens, it is difficult to satisfactorily correct the spherical aberration with a simple convex-concave-convex triplet type lens group. Therefore, the second lens group $G_2$ comprises the positive lens component $L_3$ composed of two convex lenses $L_{31}$ and $L_{32}$, a negative lens $L_4$, and a positive lens $L_5$.

In addition, it is preferable for the zoom lens of the present invention to satisfy the following condition or expression:

$$-3 < q < 0 \tag{5}$$

where q is a shape factor of the negative lens $L_4$ of the second lens group. The shape factor q of the negative lens $L_4$ is expressed as $$q = (R_b + R_a)/(R_b - R_a) \tag{6}$$

where $R_a$ is the radius of curvature of the object-side lens surface of the negative lens $L_4$, and $R_b$ is the radius of curvature of the image-side lens surface of the negative lens $L_4$.

Expressions (5) and (6) define the shape of the negative lens $L_4$ of the second lens group $G_2$. When the value of the shape factor falls below the lower limit of the inequality (5), the spherical aberration in the focal length is likely to curve near the wide-angle end. It is not preferable. When the shape factor exceeds above the upper limit of inequality (5), it is difficult to maintain the air gap between the first lens group $G_1$ and the second lens group $G_2$, i.e. the working distance required to provide the change of power. Moreover, the curvature of spherical aberration in the focal length in this case is near the wide-angle end. It is preferable for the shape factor to range from −1.0 to −0.1.

According to the present invention, an aperture stop is positioned in the vicinity of the positive lens component $L_3$ of the second lens group $G_2$ in order to reduce the field curvature during the zooming.

Since the cost reduction is the primary object of the present invention, it is preferable to position the aperture stop immediately in front of the positive lens components $L_3$. In this arrangement, the lenses of the second lens group $G_2$ may be accommodated in a single lens chamber and, consequently, the optical axes of the respective lenses of the second lens group $G_2$ can be easily aligned with each other.

BRIEF DESCRIPTION OF THE DRAWINGS

The above and other objects, features, and advantages of the present invention will be apparent from the following detailed description of the attached drawings, wherein:

FIGS. 2A–2E illustrate various aberrations of the zoom lens according to the first embodiment, where the lens is at the wide-angle end during infinity photographing.

FIGS. 3A–3E illustrate various aberrations of the zoom lens according to the first embodiment, where the lens is at the wide-angle end during close range photographing.

FIGS. 4A–4E illustrate various aberrations of the zoom lens according to the first embodiment, where the lens is set at a middle power during infinity photographing.

FIGS. 5A–5E illustrate various aberrations of the zoom lens according to the first embodiment, where the lens is set at a middle power range during close range photographing.

FIGS. 6A–6E illustrate various aberrations of the zoom lens according to the first embodiment, where the lens is at the telephoto end during infinity photographing.

FIGS. 7A–7E illustrate various aberrations of the zoom lens according to the first embodiment where the lens is at the telephoto end during close range photographing.

FIGS. 9A–9E illustrate various aberrations of the zoom lens according to the second embodiment, where the lens is at the wide-angle end during infinity photographing.

FIGS. 10A–10E illustrate various aberrations of the zoom lens according to the second embodiment, where the lens is at the wide-angle end during close range photographing.

FIGS. 11A–11E illustrate various aberrations of the zoom lens according to the second embodiment, where the lens is set at a middle power during infinity photographing.

FIGS. 12A–12E illustrate various aberrations of the zoom lens according to the second embodiment, where the lens is set at a middle power range during close range photographing.

FIGS. 13A–13E illustrate various aberrations of the zoom lens according to the second embodiment, where the lens is at the telephoto end during infinity photographing.

FIG. 15 illustrates the structure of the zoom lens according to the third embodiment of the invention.

FIGS. 16A–16E illustrate various aberrations of the zoom lens according to the third embodiment, where the lens is at the wide-angle end during infinity photographing.

FIGS. 17A–17E illustrate various aberrations of the zoom lens according to the third embodiment, where the lens is at the wide-angle end during close range photographing.

FIGS. 18A–18E illustrate various aberrations of the zoom lens according to the third embodiment, where the lens is set at a middle power during infinity photographing.

FIGS. 19A–19E illustrate various aberrations of the zoom lens according to the third embodiment, where the lens is set at a middle power range during close range photographing.

FIGS. 20A–20E illustrate various aberrations of the zoom lens according to the third embodiment, where the lens is at the telephoto end during infinity photographing.

FIGS. 21A–21E illustrate various aberrations of the zoom lens according to the third embodiment, where the lens is at the telephoto end during close range photographing.

DETAILED DESCRIPTION OF THE PREFERRED EMBODIMENTS

The preferred embodiments of the invention will be described with reference to the attached drawings.

Figure 1:
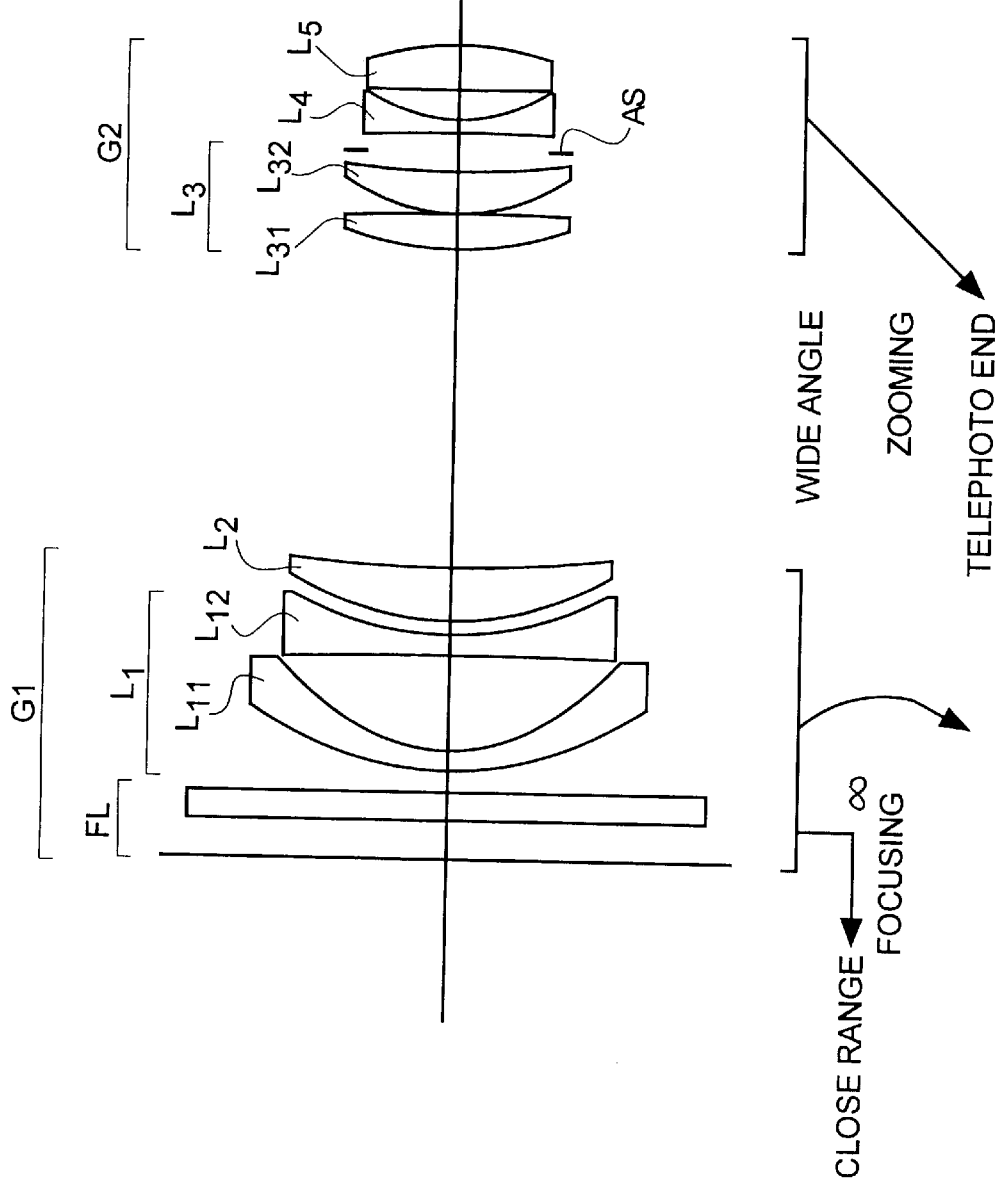
FIG. 1 illustrates the structure of the zoom lens according to the first embodiment of the present invention.
Figure 8:
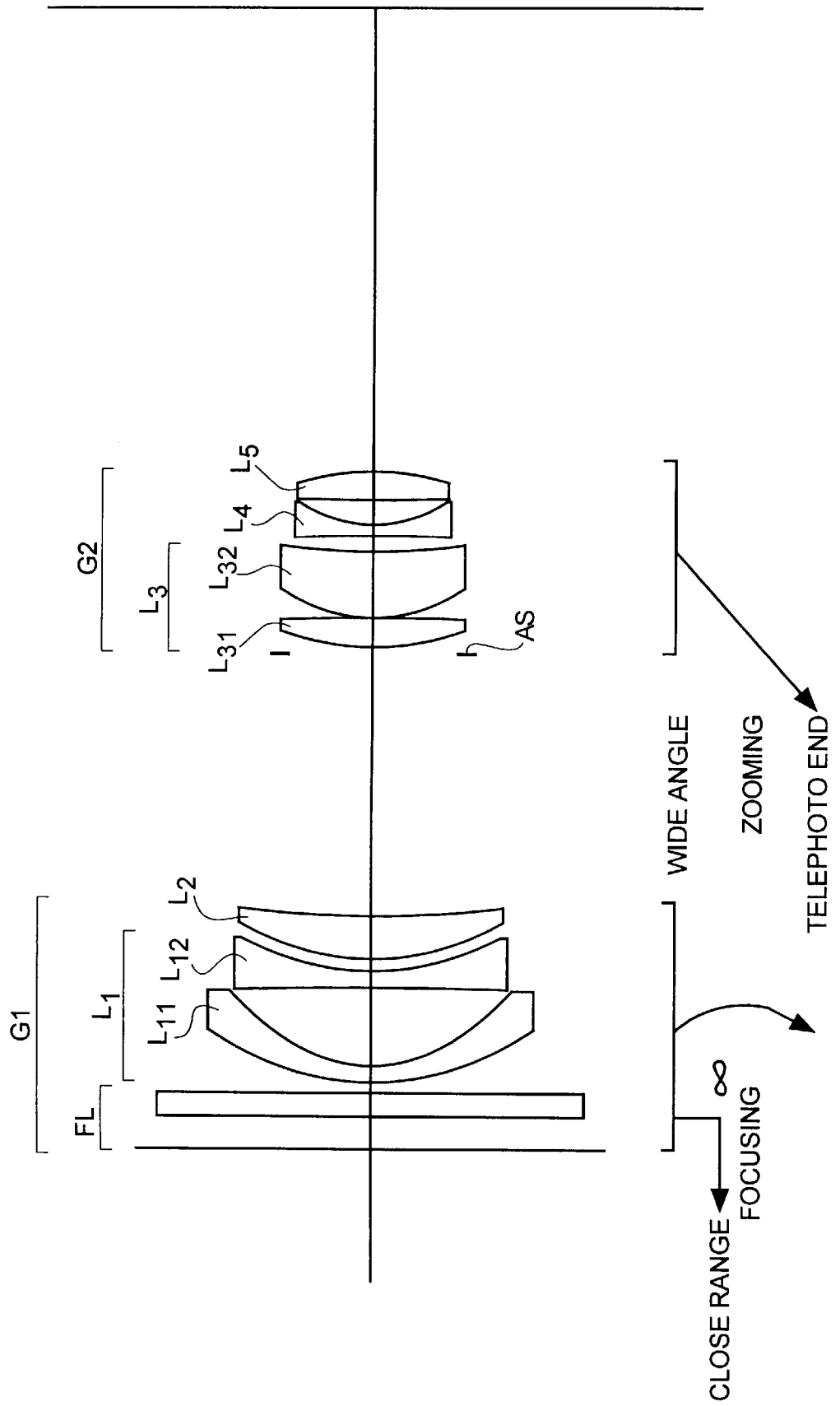
FIG. 8 illustrates the structure of the zoom lens according to the second embodiment of the invention.
Figures 14A, 14B, 14C, 14D:
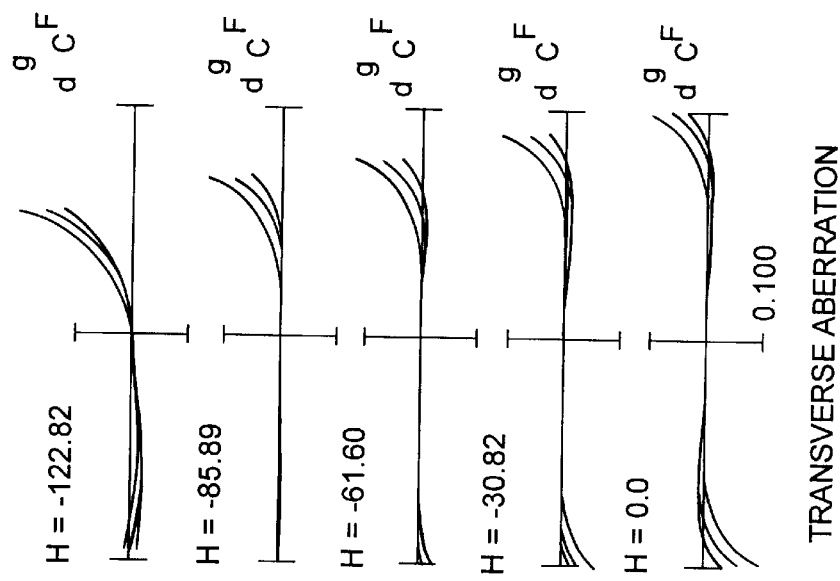
FIGS. 14A–14E illustrate various aberrations of the zoom lens according to the second embodiment where the lens is at the telephoto end during close range photographing.
Figure 14E:
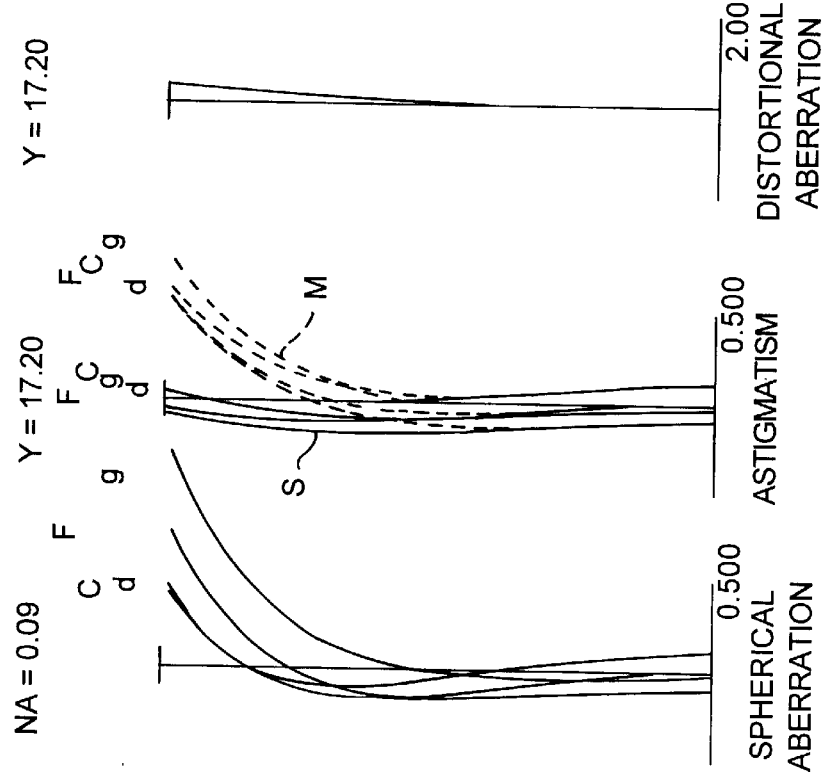

FIGS. 1, 8 and 15 illustrate the lens structure of the zoom lens according to a first, second and third embodiment of the invention. In each figure, the zoom lens is at the wide-angle end while focusing on the infinity. Each of the zoom lens comprises a first lens group $G_1$ having a negative refractive power and a second lens group $G_2$ having a positive refractive power in that order from the object side.

The first lens group $G_1$ consists of a negative lens component $L_1$, which is composed of a negative meniscus lens $L_{11}$ and a negative lens $L_{12}$, and a positive lens $L_2$ in that order from the object side. The second lens group $G_2$ consists of a positive lens component $L_3$, which is composed of two positive lenses $L_{31}$ and $L_{32}$, a negative lens $L_4$, and a positive lens $L_5$. A removable filter FL is positioned in front of the first lens group $G_1$.

When the focal length of the whole lens system changes from the wide-angle end to the telephoto end during the zooming, the first lens group $G_1$ moves along a parabola which is open toward the object side, while the second lens group $G_2$ moves along an oblique line from the image side to the object side. Meanwhile, when the zoom lens focuses on an object located in the close range changing from the infinity, the first lens group $G_1$ moves from the image side to the object side. These movements of the lens groups are indicated by the arrows in FIGS. 1, 8 and 15.

In each embodiment, an aperture stop AS is positioned close to the positive lens component $L_3$ of the second lens group $G_2$. In particular, in the first embodiment, the aperture stop AS is positioned behind the positive lens component $L_3$ (that is, on the image side of the positive lens component $L_3$), while, in the second embodiment, the aperture stop is positioned immediately before the positive lens component $L_3$ (that is, on the object side of the positive lens component $L_3$). In the third embodiment, the aperture stop is positioned between the two positive lenses $L_{31}$ and $L_{32}$ which comprise the positive lens component $L_3$. The effective diameter of the aperture stop AS is kept constant when the zoom lens changes its magnification from the wide-angle end to the telephoto end.

The parameter values for the respective embodiments are listed in Tables 1 through 3. In "Major Parameters" of each table, parameter f is the focal length, in mm, of the overall lens system, $F_{NO}$ is the F-number; 2ω is the angle of view.

In "Lens Parameters," the first column denotes the lens surface, or plane number, counted from the object side, r in the second column denotes the radius of curvature, in mm, of each lens plane, d in the third column denotes a distance, in mm, between two adjacent lens planes, the fourth column "Deff" denotes the effective diameter of each lens plane, the fifth column "$v_d$" denotes the Abbe number of each lens with respect to the d-line (λ=587.6 nm) of a lens, the sixth column denotes the refractive index $n_d$ of a lens for the d-line, and the seventh column denotes the identification of each lens.

R in the "Variable Ranges During Zooming: Close Range" denotes a photographing range.

The Table 4 lists values of the parameters which appear in the expressions (1) through (5).

TABLE 1

[Major Parameters]

f: 28.5–55.8  F$_{NO}$: 3.5–5.3  2ω: 64.4°–32.4°

[Lens Parameters]

| | r | d | Deff | vd | n$_d$ | |
|---|---|---|---|---|---|---|
| 1 | (FL) | 2.6000 | 37.24 | | | |
| 2 | ∞ | 2.0000 | 33.76 | 64.10 | 1.516800 | FL |
| 3 | ∞ | 1.0000 | 32.18 | | | |
| 4 | 24.0425 | 1.5000 | 25.81 | 33.89 | 1.803840 | L$_{11}$ |
| 5 | 14.4776 | 6.5000 | 22.07 | | | |
| 6 | −493.480 | 1.5000 | 21.19 | 40.90 | 1.796310 | L$_{12}$ |
| 7 | 24.4045 | 1.0000 | 19.90 | | | |
| 8 | 21.5255 | 3.5000 | 20.00 | 25.50 | 1.804581 | L$_2$ |
| 9 | 93.0678 | (D$_1$) | 19.63 | | | |
| 10 | 34.4403 | 2.2000 | 14.80 | 55.60 | 1.696800 | L$_{31}$ |
| 11 | −227.8123 | 0.1000 | 14.68 | | | |
| 12 | 14.2791 | 3.2000 | 14.32 | 58.54 | 1.612720 | L$_{32}$ |
| 13 | 106.7461 | 1.2000 | 13.53 | | | |
| 14 | (AS) | 1.2000 | 12.74 | | | |
| 15 | −63.5976 | 1.2000 | 12.00 | 27.61 | 1.755200 | L$_4$ |
| 16 | 13.6618 | 1.6000 | 11.29 | | | |
| 17 | 225.2890 | 3.3000 | 11.36 | 38.03 | 1.603420 | L$_5$ |
| 18 | −20.6444 | (BF) | 11.60 | | | |

[Variable Ranges During Zoom: Infinity]

| f | 28.5 | 42.0 | 58.8 |
|---|---|---|---|
| D$_1$ | 21.76423 | 8.81781 | 1.00885 |
| BF | 38.40663 | 48.29715 | 60.60537 |

[Variable Ranges During Zooming: Close Range]

| R | 471.5 | 468.4 | 472.9 |
|---|---|---|---|
| D$_1$ | 25.49480 | 12.54838 | 4.73942 |
| BF | 38.40663 | 48.29715 | 60.60537 |

TABLE 2

[Major Parameters]

f: 28.5–55.8  F$_{NO}$: 3.5–5.3  2ω: 64.4°–32.4°

[Lens Parameters]

| | r | d | Deff | vd | n$_d$ | |
|---|---|---|---|---|---|---|
| 1 | (FL) | 2.6000 | 37.23 | | | |
| 2 | ∞ | 2.0000 | 33.75 | 64.10 | 1.516806 | FL |
| 3 | ∞ | 1.0000 | 32.17 | | | |
| 4 | 24.0425 | 1.5000 | 25.80 | 33.89 | 1.803840 | L$_{11}$ |
| 5 | 14.4776 | 6.5000 | 22.07 | | | |
| 6 | 493.4806 | 1.5000 | 21.19 | 40.90 | 1.796310 | L$_{12}$ |
| 7 | 24.4045 | 1.0000 | 19.90 | | | |
| 8 | 21.5255 | 3.5000 | 20.00 | 25.50 | 1.804581 | L$_2$ |
| 9 | 93.0678 | (D1) | 19.63 | | | |
| 10 | (AS) | 0.5000 | 14.12 | | | |
| 11 | 36.5796 | 2.5000 | 14.42 | 58.54 | 1.612720 | L$_{31}$ |
| 12 | −83.1097 | 0.1000 | 14.42 | | | |
| 13 | 14.2590 | 5.3000 | 14.17 | 58.54 | 1.612720 | L$_{32}$ |
| 14 | 64.5858 | 1.2000 | 12.45 | | | |
| 15 | −67.7805 | 1.2000 | 12.04 | 27.61 | 1.755200 | L$_4$ |
| 16 | 13.9476 | 1.7000 | 11.32 | | | |
| 17 | 320.0662 | 2.5000 | 11.43 | 38.03 | 1.603420 | L$_5$ |
| 18 | −20.4228 | (BF) | 11.60 | | | |

[Variable Ranges During Zoom: Infinity]

| f | 28.5 | 42.0 | 58.8 |
|---|---|---|---|
| D$_1$ | 21.91312 | 8.96670 | 1.15774 |
| BF | 38.221439 | 48.11201 | 60.42022 |

[Variable Ranges During Zooming: Close Range]

| R | 472.5 | 469.4 | 473.9 |
|---|---|---|---|
| D$_1$ | 25.64369 | 12.69727 | 4.88831 |
| BF | 38.22149 | 48.11201 | 60.420227 |

TABLE 3

[Major Parameters]

f: 28.5–55.8  F$_{NO}$: 3.3–5.7  2ω: 64.4°–32.3°

[Lens Parameters]

| | r | d | Deff | vd | n$_d$ | |
|---|---|---|---|---|---|---|
| 1 | (FL) | 2.6000 | 37.23 | | | |
| 2 | ∞ | 2.0000 | 32.89 | 64.10 | 1.516800 | FL |
| 3 | ∞ | 1.0000 | 31.32 | | | |
| 4 | 25.5000 | 1.5000 | 25.44 | 33.89 | 1.803840 | L$_{11}$ |
| 5 | 14.3512 | 6.5000 | 21.65 | | | |
| 6 | −132.5599 | 1.5000 | 20.93 | 45.37 | 1.796681 | L$_{12}$ |
| 7 | 39.6362 | 1.0000 | 20.09 | | | |
| 8 | 25.4667 | 3.5000 | 20.00 | 25.50 | 1.804581 | L$_2$ |
| 9 | 98.0332 | (D1) | 19.56 | | | |
| 10 | 23.9560 | 2.5000 | 14.59 | 58.54 | 1.612720 | L$_{31}$ |
| 11 | −129.8146 | 1.0000 | 14.11 | | | |
| 12 | (AS) | 0.7000 | 13.20 | | | |
| 13 | 15.9243 | 4.2760 | 13.07 | 50.84 | 1.658440 | L$_{32}$ |
| 14 | 106.6488 | 1.0000 | 11.91 | | | |
| 15 | −56.7662 | 1.2000 | 11.60 | 27.61 | 1.755200 | L$_4$ |
| 16 | 13.7130 | 1.7000 | 11.01 | | | |
| 17 | −182.3408 | 2.5000 | 11.13 | 38.63 | 1.603420 | L$_5$ |
| 18 | −20.1835 | (BF) | 11.60 | | | |

[Variable Ranges During Zoom: Infinity]

| f | 28.5 | 42.0 | 58.8 |
|---|---|---|---|
| D$_1$ | 21.94580 | 8.86408 | 0.97352 |
| BF | 37.32219 | 47.10895 | 59.28804 |

[Variable Ranges During Zooming: Close Range]

| R | 499.3 | 499.3 | 493.3 |
|---|---|---|---|
| D$_1$ | 59.98003 | 46.87223 | 39.01570 |
| BF | 37.32219 | 47.10895 | 59.28004 |

TABLE 4

| Embodiment No. | 1 | 2 | 3 |
|---|---|---|---|
| f$_1$ | −39.583 | −39.583 | −40.000 |
| f$_2$ | 29.000 | 29.000 | 28.998 |
| F$_W$ | 28.500 | 28.500 | 28.500 |
| N$_d$ | 1.801577 | 1.801577 | 1.801701 |
| φ$_1$ | 12.95 | 12.95 | 12.75 |
| φ$_2$ | 11.05 | 11.05 | 10.85 |
| R$_1$ | 24.0425 | 24.0425 | 25.500 |
| R$_2$ | 14.4776 | 14.4776 | 14.3512 |
| R$_a$ | −63.5976 | −67.7805 | −56.7662 |
| R$_b$ | 13.6618 | 13.9476 | 13.7130 |
| (1) f$_2$/F$_W$ | 1.018 | 1.018 | 1.017 |
| (2) f$_1$/F$_W$ | −1.388 | −1.388 | −1.404 |
| (3) 1/(N$_d$f$_1$) | −0.014 | −0.014 | −0.014 |
| (4) \|φ$_1$/R$_1$ − φ$_2$/R$_2$\| | 0.225 | 0.225 | 0.256 |
| (5) q | −0.646 | −0.659 | −0.611 |

FIG. 2 shows spherical aberration, astigmatism, distortional aberration, chromatic aberration of magnification, and transverse aberration of the zoom lens in the first embodiment at the wide-angle end in the infinity focusing state. FIGS. 3A–3E show the same aberrations at the wide-angle end, but in the close range focusing state. FIGS. 4A–4E and 5A–5E show the same aberrations of the zoom lens at a middle range magnification in the infinity focusing state and in the close range focusing state, respectively. FIGS. 6A–6E and 7A–7E show the same aberrations of the zoom lens at the telephoto end in the infinity focusing state and in the close range focusing state, respectively. FIGS. 9A through 14E show the same aberrations of the zoom lens according to the second embodiment of the invention under the same conditions as the first embodiment. FIGS. 16A through 21E show the same aberrations of the zoom lens according to the third embodiment of the invention under the same conditions as the first embodiment.

In each aberration diagram, $F_{NO}$ denotes the F-number, NA denotes the numerical aperture, Y denotes the image height, in mm, ω denotes half of the angle of view, H denotes the object height, in mm, d denotes the d-line (λ=587.6 nm), C denotes the C-line (λ=656.3 nm), F denotes the F-line (λ=486.1 nm), and g denotes the g-line (λ=436.6 nm). In the astigmatism diagrams, the solid lines S indicate the sagittal image surfaces, and the dashed lines M indicate the meridional image surfaces. The chromatic aberrations in magnification are indicated with respect to the d-line.

As is clear from the aberration diagrams, various aberrations are satisfactorily corrected in the respective embodiments.

According to the present invention, a compact photographic zoom lens system having a variable power ratio of two or greater is achieved with a zoom lens having a simple structure. Moreover, image vibration may be satisfactory compensated by moving one or more lenses in the second lens group $G_2$ in the direction perpendicular to the optical axis.

While the invention has been described by way of exemplary embodiments, it is understood that the invention is not limited to the particulars disclosed. The invention extends to all equivalent structures, components, means and uses that are properly within the spirit and the scope of the invention, which will be apparent for those skilled in the art.

We claim:

1. A compact zoom lens, comprising:
   a lens assembly including a first lens group having a negative refractive power and a second lens group having a positive refractive power in order from the object side;
   said first lens group including at least one negative lens component and at least one positive lens component in order from the object side;
   said second lens group including at least a positive lens component, a negative lens, and another positive lens in order from the object side;
   said second lens group being movable from the image side to the object side when the focal length of the whole lens system is varied from its wide-angle position to the telephoto position; and
   said compact zoom lens satisfying the following conditions:

$$0.7 < f_2/F_W < 1.4$$
   $$-1.7 < f_1/F_W < -1.0$$
   $$-0.018 < 1/(N_d f_1) < -0.011$$

where $f_1$ is the focal length of the first lens group, $f_2$ is the focal length of the second lens group, $F_W$ is the focal length of the entire lens system at the wide-angle end, and $N_d$ is the average of the refractive indices of the lenses in the first lens group with respect to d-line.

2. The compact zoom lens of claim 1, wherein the negative lens component of the first lens group consists of a negative meniscus lens and a negative lens, and the zoom lens further satisfies the condition:

$$0.07 < |\varnothing_1/R_1 - \varnothing_2/R_2| 0.9$$

where $\varnothing_1$ is the effective radius of the object-side lens surface of said negative meniscus lens, $\varnothing_2$ is the effective radius of the image-side lens surface of said negative meniscus lens, $R_1$ is the radius of curvature of the object-side lens surface of said negative meniscus lens, and $R_2$ is the radius of curvature of the image-side lens surface of said negative meniscus lens.

3. The compact zoom lens of claim 2, wherein the positive lens component of the second lens group consists of a first positive lens and a second positive lens and the zoom lens further satisfies the condition:

$$-3 < q < 0$$

where q is the shape factor of the negative lens of the second lens group.

4. The compact zoom lens according to claim 3, wherein an aperture stop is positioned in a vicinity of the positive lens component of the second lens group.

5. The compact zoom lens according to claim 2, wherein an aperture stop is positioned in a vicinity of the positive lens component of the second lens group.

6. The compact zoom lens of claim 1, wherein the positive lens component of the second lens group consists of a first positive lens and a second positive lens and the zoom lens further satisfies the condition:

$$-3 < q < 0$$

where q is the shape factor of the negative lens of the second lens group.

7. The compact zoom lens according to claim 6, wherein an aperture stop is positioned in a vicinity of the positive lens component of the second lens group.

8. The compact zoom lens according to claim 1, wherein an aperture stop is positioned in a vicinity of the positive lens component of the second lens group.

9. A compact zoom lens, comprising:
   a lens assembly including a first lens group having a negative refractive power and a second lens group having a positive refractive power in order from the object side;
   said first lens group including at least one negative lens component and at least one positive lens component in order from the object side, said negative lens component consisting of a negative meniscus lens and a negative lens;
   said second lens group including at least a positive lens component, a negative lens, and another positive lens in order from the object side;
   said second lens group being movable from the image side to the object side when the focal length of the whole lens system is varied from its wide-angle position to the telephoto position; and
   said compact zoom lens satisfying the following conditions:

$$0.7 < f_2/F_W < 1.4$$
   $$-1.7 < f_1/F_W < -1.0$$
   $$0.07 < |\varnothing_1/R_1 - \varnothing_2/R_2| < 0.9$$

where $f_1$ is the focal length of the first lens group, $f_2$ is the focal length of the second lens group, $F_W$ is the focal length of the entire lens system at the wide-angle end, $\varnothing_1$ is the effective radius of the object-side lens surface of said negative meniscus lens, $\varnothing_2$ is the effective radius of the image-side lens surface of said negative meniscus lens, $R_1$ is the radius of curvature of the object-side lens surface of said negative meniscus lens, and $R_2$ is the radius of curvature of the image-side lens surface of said negative meniscus lens.

10. The compact zoom lens of claim 9, wherein the positive lens component of the second lens group consists of a first positive lens and a second positive lens and the zoom lens further satisfies the condition:

$$-3<q<0$$

where q is the shape factor of the negative lens of the second lens group.

11. The compact zoom lens according to claim 10, wherein an aperture stop is positioned in a vicinity of the positive lens component of the second lens group.

12. The compact zoom lens according to claim 9, wherein an aperture stop is positioned in a vicinity of the positive lens component of the second lens group.

13. A compact zoom lens, comprising:

a lens assembly including a first lens group having a negative refractive power and a second lens group having a positive refractive power in order from the object side;

said first lens group including at least one negative lens component and at least one positive lens component in order from the object side;

said second lens group including at least a positive lens component, a negative lens, and another positive lens in order from the object side, the positive lens component of the second lens group consisting of a first positive lens and a second positive lens; and said second lens group being movable from the image side to the object side when the focal length of the whole lens system is varied from its wide-angle position to the telephoto position;

the compact zoom lens satisfying the following conditions:

$$0.7<f_2/F_W<1.4$$

$$-1.7<f_1/F_W<-1.0$$

$$-3<q<0$$

where $f_1$ is the focal length of the first lens group, $f_2$ is the focal length of the second lens group, $F_W$ is the focal length of the entire lens system at the wide-angle end, and q is the shape factor of the negative lens of the second lens group.

14. The compact zoom lens according to claims 13, wherein an aperture stop is positioned in a vicinity of the positive lens component of the second lens group.

\* \* \* \* \*